(12) United States Patent
Sotzing et al.

(10) Patent No.: US 11,043,728 B2
(45) Date of Patent: Jun. 22, 2021

(54) FLEXIBLE FABRIC ANTENNA SYSTEM COMPRISING CONDUCTIVE POLYMERS AND METHOD OF MAKING SAME

(71) Applicant: University of Connecticut, Farmington, CT (US)

(72) Inventors: Gregory Allen Sotzing, Storrs, CT (US); Yang Cao, Glastonbury, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 22 days.

(21) Appl. No.: 16/393,064

(22) Filed: Apr. 24, 2019

(65) Prior Publication Data

US 2019/0326656 A1  Oct. 24, 2019

Related U.S. Application Data

(60) Provisional application No. 62/661,899, filed on Apr. 24, 2018.

(51) Int. Cl.

| | |
|---|---|
| *H01Q 1/14* | (2006.01) |
| *C09D 5/24* | (2006.01) |
| *C09D 165/00* | (2006.01) |
| *D06N 3/12* | (2006.01) |
| *H01Q 1/36* | (2006.01) |
| *H01Q 1/38* | (2006.01) |
| *A41D 1/00* | (2018.01) |
| *A43B 3/00* | (2006.01) |

(52) U.S. Cl.
CPC .............. *H01Q 1/14* (2013.01); *A41D 1/002* (2013.01); *C09D 5/24* (2013.01); *C09D 165/00* (2013.01); *D06N 3/12* (2013.01); *H01Q 1/364* (2013.01); *H01Q 1/38* (2013.01); *A43B 3/0005* (2013.01)

(58) Field of Classification Search
CPC ........ H01Q 1/14; H01Q 1/273; H01Q 9/0407; H01Q 1/364; H01Q 1/38; C09D 7/65; C09D 5/24; C09D 165/00; D06N 3/12; A41D 1/002; A43B 3/0005; C08G 2261/3223; C08G 2261/512; C08G 2261/794; D06M 15/63; D06M 15/3566; D06M 2101/32; D06M 11/79; D06M 23/16

See application file for complete search history.

(56) References Cited

U.S. PATENT DOCUMENTS

| | | |
|---|---|---|
| 4,983,814 A | 1/1991 | Ohgushi et al. |
| 6,184,280 B1 | 2/2001 | Shibuta |
| | (Continued) | |

FOREIGN PATENT DOCUMENTS

| | | |
|---|---|---|
| JP | 2008138300 A | 6/2008 |
| JP | 2008179923 A | 8/2008 |
| | (Continued) | |

OTHER PUBLICATIONS

Akerfeldt et al., "Influence of coating parameters on textile and electrical porperties of poly(3, 4-ethylene dioxythiophene): poly-(styrene sulfonate)/polyurethane-coated textile" Textile Research Journal 83.20 (2013), 2164-2176.

(Continued)

*Primary Examiner* — Daniel D Chang
(74) *Attorney, Agent, or Firm* — Cantor Colburn LLP

(57) ABSTRACT

Disclosed herein are flexible metal-free antenna systems using fabric coated with electrically conductive polymers.

20 Claims, 9 Drawing Sheets

(56) References Cited

U.S. PATENT DOCUMENTS

| | | | |
|---|---|---|---|
| 6,377,216 B1* | 4/2002 | Cheadle | H01Q 1/273 |
| | | | 343/700 MS |
| 6,919,105 B2 | 7/2005 | Xue et al. | |
| 7,413,802 B2 | 8/2008 | Karayianni et al. | |
| 7,559,902 B2 | 7/2009 | Ting et al. | |
| 7,785,496 B1 | 8/2010 | Shim et al. | |
| 7,951,902 B2 | 5/2011 | Sotzing | |
| 8,107,153 B2 | 1/2012 | Sotzing et al. | |
| 8,178,629 B2 | 5/2012 | Sotzing et al. | |
| 8,753,542 B2 | 6/2014 | Sotzing | |
| 8,760,748 B2 | 6/2014 | Sotzing et al. | |
| 8,908,252 B2 | 12/2014 | Sotzing et al. | |
| 9,628,924 B2* | 4/2017 | Bauman | H01Q 19/10 |
| 9,644,313 B2 | 5/2017 | Sotzing | |
| 10,003,126 B2 | 6/2018 | Sotzing | |
| 10,005,914 B2 | 6/2018 | Sotzing | |
| 10,431,879 B2* | 10/2019 | Kitchener | H01Q 1/27 |
| 2001/0045547 A1 | 11/2001 | Senecal et al. | |
| 2005/0068603 A1 | 3/2005 | Berggren et al. | |
| 2005/0237594 A1 | 10/2005 | Ho et al. | |
| 2005/0255139 A1 | 11/2005 | Hurd et al. | |
| 2006/0281382 A1 | 12/2006 | Karayianni et al. | |
| 2007/0042179 A1 | 2/2007 | Karayianni et al. | |
| 2007/0054577 A1 | 3/2007 | Avloni | |
| 2007/0065586 A1 | 3/2007 | Tao et al. | |
| 2007/0078324 A1 | 4/2007 | Wijisiriwardana | |
| 2007/0089845 A1 | 4/2007 | Sotzing et al. | |
| 2007/0100666 A1 | 5/2007 | Stivoric et al. | |
| 2007/0215232 A1 | 9/2007 | Hassonjee et al. | |
| 2007/0222909 A1 | 9/2007 | Slikkerveer et al. | |
| 2008/0135310 A1 | 6/2008 | Pomposo Alonso et al. | |
| 2008/0170982 A1 | 7/2008 | Zhang et al. | |
| 2008/0318002 A1 | 12/2008 | Burr et al. | |
| 2009/0005748 A1 | 1/2009 | Ales et al. | |
| 2009/0281394 A1 | 11/2009 | Russell et al. | |
| 2010/0028559 A1 | 2/2010 | Yan et al. | |
| 2010/0163283 A1 | 7/2010 | Hamedi et al. | |
| 2010/0185398 A1 | 7/2010 | Berns et al. | |
| 2010/0245971 A1 | 9/2010 | Sotzing et al. | |
| 2010/0294335 A1 | 11/2010 | Huang et al. | |
| 2011/0027869 A1 | 2/2011 | Hatton et al. | |
| 2011/0175065 A1 | 7/2011 | De La Vega et al. | |
| 2011/0304964 A1 | 12/2011 | Fleischer et al. | |
| 2011/0315204 A1 | 12/2011 | Gleason et al. | |
| 2011/0317240 A1 | 12/2011 | Sotzing et al. | |
| 2012/0153236 A1 | 6/2012 | Cakmak et al. | |
| 2012/0164429 A1 | 6/2012 | Shah et al. | |
| 2012/0224247 A1 | 9/2012 | Sotzing et al. | |
| 2012/0274616 A1 | 11/2012 | Scribner et al. | |
| 2013/0281815 A1 | 10/2013 | Varadan | |
| 2013/0338472 A1 | 12/2013 | Macia Barber et al. | |
| 2014/0011004 A1 | 1/2014 | Sotzing et al. | |
| 2014/0318699 A1 | 10/2014 | Longinotti-Buitoni et al. | |
| 2015/0017421 A1 | 1/2015 | Sotzing | |
| 2015/0199602 A1 | 7/2015 | Van Der Weide et al. | |
| 2016/0258110 A1 | 9/2016 | Alamer | |
| 2016/0310032 A1 | 10/2016 | Sotzing et al. | |
| 2016/0312044 A1 | 10/2016 | Sotzing | |
| 2016/0315380 A1 | 10/2016 | Sotzing | |
| 2016/0338645 A1 | 11/2016 | Tsukada et al. | |
| 2017/0018326 A1 | 1/2017 | Sotzing et al. | |
| 2017/0352948 A1 | 12/2017 | Urcia et al. | |
| 2018/0014780 A1 | 1/2018 | Sotzing et al. | |
| 2018/0035576 A1 | 2/2018 | Bostani et al. | |
| 2018/0061518 A1 | 3/2018 | Kinlen et al. | |

FOREIGN PATENT DOCUMENTS

| | | |
|---|---|---|
| WO | 03074627 A1 | 9/2003 |
| WO | 2006051380 A1 | 5/2006 |
| WO | 2006051384 A1 | 5/2006 |
| WO | 2007099889 A1 | 7/2007 |
| WO | 2008066458 A1 | 6/2008 |
| WO | 2008098136 A1 | 8/2008 |
| WO | 2010003138 A1 | 1/2010 |
| WO | 2010022353 A1 | 2/2010 |
| WO | 2010114718 A1 | 10/2010 |
| WO | 20100141743 A1 | 12/2010 |
| WO | 2013096356 A1 | 6/2013 |
| WO | 2015138298 A1 | 9/2015 |

OTHER PUBLICATIONS

Coating Guide Clevios TM P Formulations. 1-12 (2012) http://www.heraeus-clevios.com/media/webmedia_local/media/datenblaetter/Clevios_P_coating_guide_08-03-18jb2.pdf.

Crispin et al., "Conductivity, Morphology, Interfacial Chemistry, and Stability of Poly(3,4-ethylene dioxythiophene)-Poly(styrene sulfonate): A Photoelectron Spectroscopy Study", Journ. of Polym. Sci. Part B: Polymer Physics, vol. 41, No. 21, Nov. 11, 2003.

Ding et al. "Conductivity trends of PEDOT-PPS impregnated fabric and the effect of conductivity on electrochromic textile." ACS Applied Materials & Interfaces, 2010, vol. 2, No. 6, pp. 1588-1593.

Electrically Conductive Artificial Leather Hayashida Yasuyuki; Wakahara Hiroyuki JP19920359254 Dec. 25, 1992 (tin oxide put into artificial leather to make it conductive) Applicant: Kanebo Ltd.

Fahad (2013) Thesis Ch. 6-7, pp. 129-182.

Hair, Michael L.; "Hydroxyl Groups on Silica Surface"; Journal of Non-Crystalline Solids, vol. 19; Dec. 1975; pp. 299-309.

Invernale et al., "All-Organic Electrochromic Spandex", ACS Applied Materials & Interfaces, 2010, 2, pp. 296-300.

Junnila et al., "An EMFi-film Sensor based Ballistocardiographic Chair: Performance and Cycle Extraction Method" IEE Workshop on Signal Processing Systems Design and Implementation; (2005) pp. 373-377.

Laforgue, "Electrically controlled colour-changing textiles using the resistive heating properties of PEDOT nanofibers Laforgue," A. 2010 Journal of Materials Chemistry 20 (38), pp. 8233-8235.

Lee (2013) Flexible graphene woven fabrics for touch sensing. Applied Physics Letters, 102 (16), 163117; 5 pages.

Lomax, "Breathable polyurethane membranes for textile and related industries", J. Mater. Chem. 17, 2007, pp. 2775-2784.

Mahbub et al., "A Low-Power Wireless Piezoelectric Sensor-Based Respiration Monitoring System Realized in CMOS Process"; IEEE Sensors Journal, (2017) vol. 17, No. 6, pp. 1858-1864.

Molina, "Electrochemical characterization of reduced graphene oxide-coated polyester fabrics." Electrochimica Acta, (2013) 93, pp. 44-52.

Negru (2012) Electrical conductivity of woven fabrics coated with carbon black particles. Fibers and Textiles. 20(1(90)), pp. 53-56.

Okuzaki, WIPO Publication No. WO2007099889A1_Abstract of published PCT Application No. PCT/JP2007/053467 filed on Feb. 26, 2007 and published on Sep. 7, 2007, 1 page.

Rajala et al., "Film-Typed Sesor Materials PVDF and EMFi in Measurement of Cardiorespiratory Signals—a Reiew" IEE Sensors Journal; (2012); vol. 12, No. 3, pp. 439-446.

Sawhney et al., "Soft Structured Sensors and Connectors by Inkjet Printing", Aatcc Review, (2007), 7 (6), pp. 1-10.

Seiko Epson Corp, JP2008179923, Abstract, Aug. 7, 2008, 2 pages.

Seok-Joo Wang, "Effect of Silica Nanoparticle Content on the Structure and Electrostatic Bonding of PEDOT:PSS, Molecular Crystals and Liquid Crystals," (2012) 568:1, 179-185.

Shateri-Khalilabad (2013) Fabricating electroconductive cotton textiles using graphene. Carbohydrate polymers, 96(1), 190-5, 6 pages.

Skotheim et al., "Handbook of Conducting Polymers", 3rd Ed., 2007, 67 pages.

Sotzing et al., Materials Research Society, 2011 Spring Meeting, Online Abstract Feb. 1, 2011, 1 page.

Suh et al., Effect of Fabric Substrate and Coating Material on the Quality of Conductive Printing, The Journal of the Textile Institute, 2013, vol. 104, No. 2, 213-222.

Tajitsu, Yoshiro; "Piezoelectret Sensor Made From and Electrospun Fluoropolymer and Its Use in a Wristband for Detecting Heart-beat Signals"; IEE Transactions on Dielectrics and Electrical Inslation; 2015, vol. 22, No. 3. pp. 1355-1359.

(56) References Cited

OTHER PUBLICATIONS

Tuba Yilmaz, Robert Foster and Yang Hao, Review—Detecting vital signs with wearable wireless sensors, in Sensors, ISSN 1424-8220, 2010, 10, 10837-10862.

Wang et al., Effect of Silica Nanoparticle Content on the Structure and Electrostatic Bonding of PEDOT:PSS, Mol. Cryst. Liq. Cryst., vol. 568: pp. 179-185, 2012.

Woltornist et al.,"Preparation of conductive graphene/graphite infused fabrics using an interface trapping method" Carbon, vol. 81, 38-42 (2015) available online Sep. 19, 2014.

Xia et al., "PEDOT:PSS films with significantly enhanced conductivities induced by preferential solvation with cosolvents and their application in polymer photovoltaic cells." J. Mater. Chem. 21, 4927-4936 (2011).

Yamashita (2013) Fabrication and evaluation of a conductive polymer coated ealstomer contact structure for woven electronic textile. Sensors and Actuators A: Physical, 195, pp. 213-218.

Feng et al., "Fiber-Based Wearable Electronics: A Review of Materials, Fabrications Devices, and Applications". Advanced Materials; (2014) 26.31, pp. 5310-5336.

Zhukov et al., "Piezoelectrets from sandwiched porous polytetrafluoroethylene (ePTFE) fils: influence of porosity and geometry on charging properties" Journal of Physics D: Applied Physics; 44.10 (2011) 105501.

\* cited by examiner

BENDING 1

FLAT

BENDING 2

FLEXIBLE FABRIC ANTENNA SYSTEM COMPRISING CONDUCTIVE POLYMERS AND METHOD OF MAKING SAME

CROSS-REFERENCE TO RELATED APPLICATION

This application claims the benefit of U.S. Provisional Application No. 62/661,899 filed Apr. 24, 2018, which is hereby incorporated by reference in its entirety.

BACKGROUND

Wearable flexible antennas are needed for next generation wearable systems for realizing body area network and personalized health monitoring. Efforts have been devoted towards bio-compatible devices based on non-metal materials in replacement of metal and metal-containing devices. Metals on fabric are toxic to the skin and cause irritation. Additionally, metals have high density. Previously reported organic antennas are either based on rigid microwave substrates or based on flexible, but not truly wearable, breathable polymer fabric films.

There remains a need in the art for new flexible antennas that are free of metal and truly wearable.

BRIEF SUMMARY

In one embodiment, a flexible metal-free antenna system comprises a radiating element comprising a conductive polymer fabric, wherein the conductive polymer fabric comprises an electrically conductive polymer disposed on at least a portion of a fibrous substrate.

In another embodiment, a process of making the antenna system comprises applying a dispersion of an electrically conductive polymer on the surface of a fibrous substrate to form the conductive polymer fabric of the radiating element.

In yet another embodiment, a method of transmitting or receiving radio frequency data comprises using a flexible metal-free antenna system comprising a radiating element comprising a conductive polymer fabric, wherein the conductive polymer fabric comprises an electrically conductive polymer disposed on at least a portion of a fibrous substrate.

DETAILED DESCRIPTION

Disclosed herein are flexible metal-free antenna systems comprising a radiating element that can be printed on portions of a surface of the fabric to form monopole antennas, (Hertzian) dipole antennas, loop antennas, conical antennas, patch antennas. The radiating element comprises a conductive polymer fabric comprising an electrically conducting polymer. These printed antennas can be further (phase) arrayed for enhanced directivity, radiation efficiency and power, as well as functionalities.

The flexible metal-free antenna system include (microstrip) patch antennas comprising a ground plane layer, a fabric dielectric layer in contact with a first surface of the ground plane layer, and a radiating element in contact with a portion of a surface of the fabric dielectric layer opposite to the ground plane layer. The radiating element comprises a conductive polymer fabric comprising an electrically conducting polymer.

The patch antenna, also known as a rectangular microstrip antenna, is a type of radio antenna with a low profile, which can be mounted on a flat surface. Two ends of the patch act like radiating slots due to the fringing fields E-fields. The fringing fields are a result of voltage distribution, making a patch antenna a "voltage radiator". The feed point for a coaxial cable is along the centerline, parallel to the length of the patch antenna, and is optimized for impedance matching.

Figure 3:
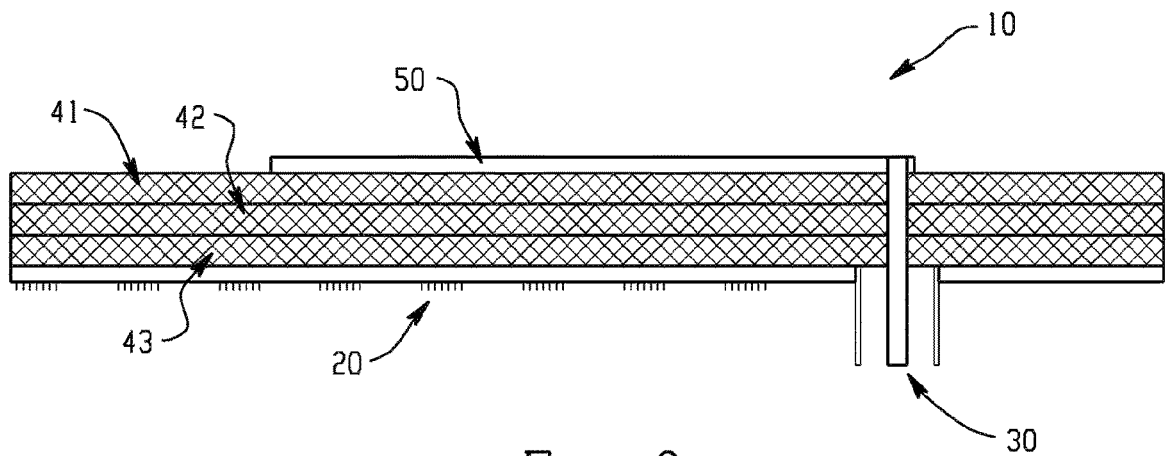
FIG. 3 illustrates a side view schematic of a patch antenna (10) with a metal-free patch (50), ground plane (20), fabric as the substrate (shown as three layers (41), (42), and (43)), and feed (30).

In an exemplary model of a metal-free patch antenna ((10), FIG. 3), an organic patch (50) radiating element comprises a flexible electrically conductive polymer layer in contact with a fabric substrate (40) as the dielectric (shown in FIG. 3 as three layers (41), (42), and (43)), where the fabric substrate is in contact with a ground plane (20). A feed (30) runs through substrate (40) and patch (50). In an exemplary embodiment, the ground plane (20) is PEDOT:PSS and the patch (50) is PEDOT:PSS that was screen printed on polyethylene terephthalate fabric as the fabric substrate (40).

Disclosed herein is the use of a conductive polymer coated on natural and all synthetic fabric, such as wool, cotton, Rayon, PET, Nylon, spandex, in the forms of knits and wovens as well as nonwovens, as a complete antenna system for Wi-Fi frequency (approx. 2.5 GHz). This system can be used for data transfer and/or as a sensor at this frequency regime, for example, for radar detection. The transmission and receiving capability of the disclosed fabric has been demonstrated at this frequency. In addition, a Doppler effect has been demonstrated using the conductive material as a sensor that detects an approaching object. Slight bending does not affect the characteristic of the antenna.

As disclosed herein is a fabric antenna that can be made through a process of screen printing of an organic conductor material that is dispersed in a fluid, such as water, to generate a highly conductive fabric capable of Wi-Fi transmission. Such material has no metal and can be incorporated into flexible and stretchable substrates such as synthetic leather and spandex. Such a system can easily be incorporated into clothing or other worn articles without a loss of comfort.

Disclosed herein are embodiments of the fabrication of a metal-free patch antenna fabricated from screen printed poly (3,4-ethylenedioxy thiophene): polystyrene sulfonate (PEDOT:PSS). Within this embodiment, the antenna consists of PEDOT:PSS screen printed on polyester (PET) nonwoven fabric serving as a radiating element and a ground plate with untreated fabric serving as a dielectric layer. The antenna operates at 2.35 GHz corresponding to Bluetooth® frequency and matches computer simulations. Antennas in the frequency range are easy to test with commonly available Vector Network Analyzers. The radiating patterns of the antenna measured under strain shows a decrease in intensity in return loss upon bending while maintaining the resonant frequency. The fabric antenna has also been shown to transmit data wirelessly to a copper receiver with a signal efficiency of 25%. This metal free approach to fabrication of antennas can be extended for applications such as, e.g., cancer detection and communication.

It is a further object of the disclosed antenna system and related methods to provide antennas for higher frequencies by making certain design and fabrication changes, such as using fabric with a different structure, using different dielectric layer material, using different concentrations of secondary dopants, and using different methods of applying conductive polymers to fabric layers, wherein those methods are among those described in U.S. Patent Publication 2016/0315380, which is incorporated herein in its entirety.

Poly (3,4-ethylenedioxythiophene): poly(styrene sulfonate) (PEDOT:PSS) has gained interest from researchers for possible replacement of metals. Owing to its ability to act as both ionic and electron conductor, PEDOT:PSS has been explored for biopotential electrodes, photovoltaics, and electrochemical transistors. PEDOT:PSS is comprised of an electrically conducting polymer PEDOT ionically associated with polystyrene sulfonate (PSS) which helps in ionic conduction and processability into thin films from water. In addition, PEDOT:PSS has highly advantageous features including high conductivity within conductive polymers, is chemically stable, has high mechanical strength, and is transparent to visible light. The intrinsic conductivity of PEDOT:PSS can be increased by adding chemicals such as DMSO, also known as secondary dopants, which leads to phase separation on insulating PSS from PEDOT. PEDOT:PSS, when coated on fabrics have been shown to have current capacities of >10 A/mm$^2$ and an ampacity comparable to CNT based substrates.

In an embodiment of the disclosed fabric, movement of a part of a body can be tracked, such as a heart rate or a breathing rate. In other embodiments, tracking can be applied to moving objects (e.g., car in motion, thrown baseball, falling tree limb, fired bullet etc.) approaching an article of clothing comprising the disclosed fabric thus constituting a wearable radar system.

It is an object of the disclosed system to provide Wi-Fi data transfer capability in an article of clothing, or in some other textile product such as that located in a home or a vehicle.

There is an unmet need for flexible, stretchable wearable fabrics and other materials that are conductive and have capability to function as sensors, data transmitters and antennae. Conductive polymers are organic and bypass the disadvantages of metal containing materials.

Conductive polymers can be easily processed onto fabrics via the process of screen printing. This form of processing has been the conventional way to print patterns onto articles of clothing as well as other things. The use of a water solution of conductive monomers and screen printing of the conductor onto fabrics bypasses disadvantages associated with the application of metals to a fabric surface. The organic conductor replaces the functionality of the metal as it pertains to electronics applications.

Additional embodiments and applications of the system and methods disclosed herein include wearable networks and flexible wearable electronic devices.

In a further embodiment, the fabric antenna has been shown to function effectively as a transmitter and/or receiver as a component of a Doppler radar system.

It is an object of the disclosed system and related methods to provide lower cost of manufacture of products comprising conductive fabrics and fibers. It is a further object to provide a low-toxicity product. The disclosed system and related methods enable a flexible and stretchable antenna system. The advantages of the disclosed system can be incorporated into a large number of textile oriented products.

In an embodiment there is an ability to screen print an organic conductor from water onto fabric, wherein the conductor is used for as a metal replacement in an antenna system to transmit and receive signals at a given frequency. The transmitter/receiver functionality of the disclosed antenna system has been demonstrated at Wi-Fi frequency (e.g., Bluetooth® frequency of about 2.5 GHz). This functionality can be extended to a GPS (global positioning system) frequency of about 6 GHz by enhancing the materials' conductivity. With the disclosed antenna system one should be able to transmit and receive at any frequency below about 2.5 GHz. Wi-Fi and radar could be incorporated into textile products such as clothing, carpet, wallpaper, automotive interior, etc. for data transfer or for sensing. In further embodiments such a system can track the motion of an organ such as the heart to monitor the heart beat thereby bypassing certain problems that exist with electrocardiogram measurements. In still a further embodiment, organic conductive polymer screen printed onto fabric, e.g. synthetic leather, can be used to track the movement of an object or the movement of a person.

Disclosed herein is a metal-free patch antenna, wherein there are no metal components and wherein the antenna comprises a conductive polymer coated synthetic leather. Suitable electrically conductive polymeric fibers, fabrics, and other material structures and methods of making can be found in U.S. Pat. No. 9,644,313, which is incorporated herein in its entirety.

Further description of polymers, compositions and fabrication methods for stretchable electrically conductive structures applicable to the antenna system and related methods disclosed herein are provided in U.S. Patent Application Publication 2016/0315380, which is incorporated herein in its entirety. Also incorporated herein by reference in their entirety are U.S. Pat. Nos. 8,107,153, 8,908,252, and 8,760,748; and U.S. Patent Application Publication 2017/0018326.

Wearable electronic devices are emerging technologies and have attracted substantial interests recently in modern applications including athletic sports training, electric skin, soft robotics, prosthetics, health care monitoring, disease diagnose, military, and consumer wearable electronics. A typical wearable system includes devices like multifunctional physiological sensing, wireless communication, energy harvesting, energy storage and electric circuits, e.g., smart watches with cardiac vital sign sensing, data analytic, wireless communication with smart phones for cloud data syncing, batteries and charging circuit. Among all devices, antenna plays an important role in ensuring robust and ubiquitous on-body and off-body communications and computing, particularly for patient monitoring, implant support, field rescue, and mission critical applications. Standards for body area network (BAN) are under development with constituent nodes be worn or in close proximity to human body for signal transmission, relay or dual-hop. The development of BAN calls for wearable antennas that are flexible to be worn. However, traditional antennas made of metal and standard dielectrics are rigid and have a small elastic strain limit in bulk form. These materials do not meet the requirements of next generation wearable devices, where devices need to be worn on a person without interrupting or limiting their motions and be integrated into a wearable platform.

With copper-based microwave substrates no longer meeting these stringent requirements, focus has been given to the development of wearable antennas that can be successfully integrated on a flexible platform. One approach is to use flexible metal-containing materials such as metal gauze painting, metal foils sewing and embroidering, metal-plated textile (electro-textile and E-textile). While these metal-containing inorganic materials have been fabricated into antennas with certain flexible and breathable capabilities, fundamental biocompatibility issue still remains for these metal-containing materials when in direct contact with human body because of allergic toxicity.

Another approach involves the use of novel non-metal conducting materials for other wearable electronics such as advanced carbon materials and conductive polymers. Organic conductive polymers are ideal materials for wearable electronics because they are intrinsically flexible and can be easily integrated into wearable platforms such as fabric and other textiles. When compared with inorganic materials, organic conductive polymers have low cost, comparable high conductivity and fundamental bio-compatibility. Among all conductive polymers, poly (3,4-ethylenedioxy thiophene): polystyrene sulfonate (PEDOT:PSS) has been the most successful conducting polymer due to its high conductivity and solution processability, PEDOT:PSS has been studied in depth in the past decade, and researchers have been mostly focused on improving the conductivity for better electric devices via various processing methods, such as thermal treatment, light treatment, solvent treatment, surface treatment, and etc. Although numerous sensors and devices have been demonstrated based on PEDOT:PSS, few antennas have been reported, especially on a truly wearable fabric platform.

In this context of the metal-free wearable electronic system, an organic fabric antenna is thus highly desired. Presented herein is an organic flexible antenna based on a conductive polymer that was screen printed on a nonwoven flexible fabric substrate. Structure control and conductivity enhancement of PEDOT:PSS were achieved via nano-template assisted chain orientation and phase-separation so that highly conductive phases could be formed and connected into continuous paths. Ultra-low effective radio frequency (RF) sheet resistance was achieved because of the Litz-wire structure of fabric fibers, which is very favorable for conductor used under high frequency. Flexible, body-worn fabric patch antennas were fabricated with the aid of ANSYS HFSS design, and fully characterized by a Vector Network Analyzer (VNA) for their radiating properties under various relaxed and flexed configurations. All measured results demonstrate a satisfactory performance. Furthermore, a Doppler radar system was developed based on these patch antennas to showcase the sensing and ranging capabilities as well as other potential applications.

Figure 1:
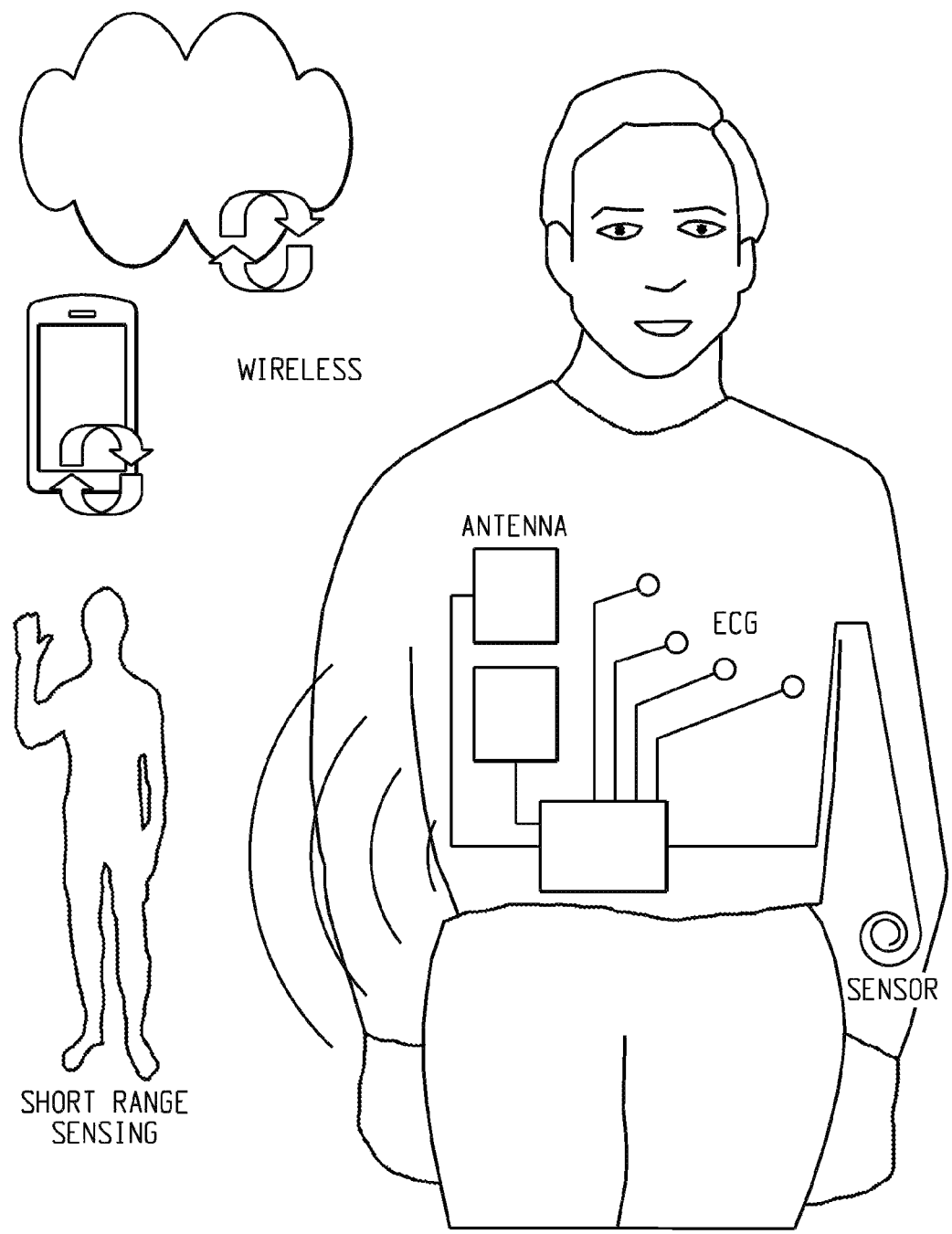
FIG. 1 is an illustration of the concept of the metal-free fabric based, next generation wearable electronic network.

The concept of the metal-free fabric based, next generation wearable electronics network is shown in FIG. 1. The system will integrate functions such as wireless communication enabled by antennas, vital signal sensing through various sensors, energy harvest through human limb motion and energy storage devices, all on a fabric clothing platform. All these devices can be easily printed on the properly selected fabric using conductive polymer inks. The resulting wearable system can be flexible, stretchable, breathable and biocompatible owing to, the wearable nature of the fabric, the templated assisted conductivity enhancement, and the organic nature of materials.

Applications of the disclosed antenna systems include remote healthcare, including wearable antenna devices; detection of adverse health events including heart attack, atrial fibrillation, stroke, and the like; sports performance; military applications; and the like. The antenna system can be incorporated into any wearable device such as a garment (e.g., wetsuit, compression shirt, etc.), footwear (e.g. sneakers, shoes, boots, etc.), headwear, or a smaller wearable device (wrist band, head band, chest strap, belt, etc.). The wearable antenna device can be worn by the user to transmit signals (bio-potentials, performance, etc.) that can be recorded and tracked by a fixed computer or a mobile device such as a smart watch, smart phone, etc. using wireless technology such as Bluetooth.

Advantages of using these antenna systems is that they can provide the device with the feel and breathability of fabric while at the same time functioning as a data transfer device. As the device will not be made from metal, it meets the requirements of various industries in the wearable electronics field.

A "fabric" is a manufactured assembly of interlacing fibers, filaments, and/or yarns having (1) substantial surface (planar) area in relation to its thickness, and (2) adequate mechanical strength to give it a cohesive structure. Most fabrics are knitted or woven, but some are produced by non-woven processes such as braiding, felting, and twisting. Applied loosely, 'fabric' also includes laces, meshes, and nets.

In an embodiment, the flexible metal-free antenna systems comprise a ground plane layer covered with one or more fabric layers, which function as a dielectric, and a portion of a fabric layer surface opposite to the ground plane being coated with a flexible electrically conductive polymer layer, which serves as the radiating element/antenna. The antenna portion prepared from a fabric coated with a flexible electrically conductive polymer can comprise a conductive polymer fabric as described herein.

The one or more fabric layers that function as the dielectric can be a polymeric fiber and fibrous substrate made from any non-electrically conducting polymeric material such as nylon 6, nylon 66, nylon 610, nylon 12, co-polymerized nylon, polyethylene terephthalate, polytrimethylene terephthalate, spandex (polyurethane-polyurea copolymer), polybutylene terephthalate, polypropylene terephthalate, polyurethane, polypropylene, polyethylene, polyester-based polyurethane, copolymers thereof, or a combination thereof.

Suitable materials that can be used to prepare the conductive polymer fabric include those materials described in U.S. Patent Publication Nos. 2015/0017421A1 to Sotzing and 2014/0011004A1 to Sotzing; U.S. patent application Ser. No. 15/135,895 filed Apr. 22, 2016, Ser. No. 15/135,898 filed Apr. 22, 2016, and Ser. No. 15/135,894 filed Apr. 22, 2016; and International Patent Publication No. WO2015/138298A1 to Sotzing et al., each of which is incorporated by reference herein.

U.S. Patent Publication No. 2015/0017421A1, now U.S. Pat. No. 9,644,313 to Sotzing discloses suitable materials that can be used to prepare the conductive polymer fabric, the relevant portions of which are reproduced below. Such materials include conductive synthetic leather, electrically conductive polymeric fibrous substrate, and electrically conductive polymeric fiber, each comprising polymeric fiber which in turn comprises desiccant particles, wherein a portion of the desiccant particles are located at the surface of the polymeric fiber. Herein, the desiccant particles are used interchangeably with "nucleophile derivatized nanoparticles". The substrates are made electrically conductive by disposing an electrically conductive polymer onto the polymeric fiber where the electrically conductive polymer is at least in partial contact with the desiccant particles. Not wishing to be bound by theory, but it is believed there is an interaction between the electrically conductive polymer and the desiccant particles which allows the coated substrate to achieve sheet resistances ranging from 0.4 to 400 Ohms/square. For example, it has been found that electrically conductive synthetic leather does not require expensive metals such as silver to obtain very low sheet resistances (1.5 Ohms/square). Commercial silver fabric is able to obtain 1 Ohm/square sheet resistance but it is costly, being prepared from a precious metal.

In an embodiment, an electrically conductive synthetic leather is prepared from poly(3,4-ethylenedioxythiophene)-polystyrenesulfonate (PEDOT-PSS).

In an embodiment, the fibrous substrate is a non-woven fibrous substrate. In an embodiment, the fibrous substrate is a synthetic leather or a synthetic suede. In another embodiment, the fibrous substrate is woven.

In an embodiment is an electrically conductive synthetic leather comprising a synthetic leather comprising polymeric fibers comprising desiccant particles wherein a portion of the desiccant particles are located at the surface of the polymeric fibers; and an electrically conductive polymer film disposed on at least a portion of the polymeric fibers and at least in partial contact with the desiccant particles.

In another embodiment, an electrically conductive fibrous substrate comprises a fibrous substrate comprising polymeric fibers comprising desiccant particles wherein a portion of the desiccant particles are located at the surface of the polymeric fiber; and an electrically conductive polymer film disposed on at least a portion of the polymeric fibers of the fibrous substrate and at least in partial contact with the desiccant particles.

In another embodiment, an electrically conductive fiber comprises a polymeric fiber comprising desiccant particles wherein a portion of the desiccant particles are located at the surface of the polymeric fiber; and an electrically conductive polymer film disposed on at least a portion of the polymeric fiber and at least in partial contact with the desiccant particles.

In an embodiment, the electrically conductive synthetic leather or the electrically conductive fibrous substrate exhibits semiconductive behavior at low temperature (e.g. below 0° C.) and metallic behavior at high temperature (e.g. above 0° C.).

In an embodiment, the electrically conductive synthetic leather or the electrically conductive fibrous substrate exhibits sheet resistances ranging from 0.4 to 400 Ohms/square.

Exemplary electrically conductive polymers that can be used to prepare the electrically conductive synthetic leather, electrically conductive fibrous substrate, and electrically conductive fiber include poly(3,4-ethylenedioxythiophene) ("PEDOT") including poly(3,4-ethylenedioxythiophene):poly(styrenesulfonate) ("PEDOT:PSS") aqueous dispersion, a substituted poly(3,4-ethylenedioxythiophene), a poly(thiophene), a substituted poly(thiophene), a poly(pyrrole), a substituted poly(pyrrole), a poly(aniline), a substituted poly(aniline), a poly(acetylene), a poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof, a combination thereof, and the like.

The electrically conductive polymer can be used in an amount of about 0.1 to about 10.0 wt % based on the weight of the substrate, specifically about 0.2 to about 8.0 wt %, more specifically about 0.3 to about 7.0 wt % and yet more specifically about 0.5 to about 5.0 wt %. In the fiber embodiment, the electrically conductive polymer can be used in an amount of about 0.1 to about 10.0 wt % based on the weight of the fiber, specifically about 0.2 to about 8.0 wt %, more specifically about 0.3 to about 7.0 wt % and yet more specifically about 0.5 to about 5.0 wt %.

The electrically conductive polymer film coating on the electrically conductive synthetic leather or the electrically conductive fibrous substrate can have an average thickness of 300 nm or less, specifically 250 nm or less, more specifically 100 nm or less, yet more specifically 30 nm or less, still yet more specifically 25 nm or less, and even more specifically 20 nm or less. The lower end of the thickness range can be about 4 nm or more.

Artificial leather can be made from any polymeric material such as nylon 6, nylon 66, nylon 610, nylon 12, co-polymerized nylon, polyethylene terephthalate, polytrimethylene terephthalate, spandex (polyurethane-polyurea copolymer), polybutylene terephthalate, polypropylene terephthalate, polyurethane, polypropylene, polyethylene, polyester-based polyurethane copolymers thereof, or a combination thereof. The artificial leather can be finished (material having a glossy surface) or unfinished (material without a glossy surface). In an embodiment, a desiccant is used to prepare the artificial leather such that the fibers of the artificial leather comprise desiccant particles wherein a portion of the desiccant particles are located at the surface of the synthetic leather fibers.

The polymeric fiber and fibrous substrate can be made from any polymeric material such as nylon 6, nylon 66, nylon 610, nylon 12, co-polymerized nylon, polyethylene terephthalate, polytrimethylene terephthalate, spandex (polyurethane-polyurea copolymer), polybutylene terephthalate, polypropylene terephthalate, polyurethane, polypropylene, polyethylene, polyester-based polyurethane, copolymers thereof, or a combination thereof. In an embodiment, a desiccant is used to prepare the fibrous substrate such that the fibers comprise desiccant particles wherein a portion of the desiccant particles are located at the surface of the fiber.

Exemplary desiccants include inorganic oxides such as silica/silicon dioxide ($SiO_2$), titania/titanium dioxide ($TiO_2$), alumina/aluminum oxide, calcium oxide, or a combination thereof. In a further embodiment, the desiccant is in particulate form having average particle size of about 1 nanometer (nm) to about 5 micrometer, specifically about 10 nm to about 500 nm, and more specifically about 25 nm to about 200 nm.

The dessicant/nucleophile derivatized nanoparticles can be present on the surface of the polymeric fiber in an amount of about 0.01 to about 6.0% area relative to the total surface area of the polymeric fiber comprising dessicant/nucleophile derivatized nanoparticles, specifically about 0.05 to about 5.0% area, and more specifically about 0.1 to about 4.0%.

The electrically conductive substrate, including electrically conductive synthetic leather, is easily scalable to high volume manufacture. The electrically conductive polymer can be applied to the synthetic leather, fibrous substrate, or fiber using a variety of different techniques. For example screen printing, drop casting, spray coating, ink jet printing, dip coating, gravure coating methods, and extrusion coating. Another approach is a soaking process. Many of these processes are easily adaptable to large scale manufacture.

These coating techniques generally comprise forming a mixture of the material to be coated with a solvent, applying the mixture to a surface of the synthetic leather substrate, and removing the solvent to form a thin film of the material adheringly disposed on the surface of the synthetic leather substrate. The solvent can be water, an organic solvent, or a combination of an organic solvent and water. Exemplary organic solvents include dimethyl sulfoxide (DMSO), dichloromethane (DCM), toluene, N,N-dimethyl formamide (DMF), propylene glycol monomethyl ether acetate (PG-MEA), propylene glycol monomethyl ether (PGME), acetone, methanol, and ethanol.

The mixture can contain the electrically conductive polymer at a concentration of about 0.1 weight percent (wt. %) to about 5 wt. %, based on the total weight of the mixture, specifically about 0.2 to about 4 wt. %, more specifically 0.3 to about 4 wt. %, and still more specifically about 1.0 to about 3 wt. %.

In an embodiment, the artificial leather, polymeric fiber, and fibrous substrate can be plasma treated prior to the application of the electrically conductive polymer. Plasma or other surface modification treatment can be used to impart good wettability and adhesion of the electrically conductive polymer on the surface of artificial leather, polymeric fiber, and fibrous substrate. In an exemplary plasma treatment process, the use of atmospheric pressure plasma (helium, argon, air, oxygen, or a combination thereof) can be used. Other exemplary surface modification includes exposing the artificial leather, polymeric fiber, and fibrous substrate to organic solvents with similar solubility parameters as DMSO. Solvent treatment can be conducted alone or in addition to plasma treatment.

A method of making an electrically conductive synthetic leather, an electrically conductive fibrous substrate, or an electrically conductive fiber comprising disposing an electrically conductive polymer onto a synthetic leather comprising polymeric fibers comprising desiccant particles wherein a portion of the desiccant particles are located at the surface of the polymeric fibers, onto a fibrous substrate comprising polymeric fibers comprising desiccant particles wherein a portion of the desiccant particles are located at the surface of the polymeric fiber, or onto a polymeric fiber comprising desiccant particles wherein a portion of the desiccant particles are located at the surface of the polymeric fiber. In an embodiment, prior to the disposing step, the synthetic leather, the fibrous substrate, and the polymeric fiber are surface treated with a plasma treatment, a solvent treatment, or a combination thereof. In an embodiment, disposing comprises screen printing.

In an embodiment, PEDOT:PSS aqueous dispersion is loaded into unfinished and finished polyethylene terephthalate leather to yield highly conductive leather samples having sheet resistances ranging from 0.4 to 400 Ohms/square.

The term "fiber" as used herein includes single filament and multi-filament fibers, i.e., fibers spun, woven, knitted, crocheted, knotted, pressed, plied, or the like from multiple filaments. No particular restriction is placed on the length of the fiber, other than practical considerations based on manufacturing considerations and intended use. Similarly, no particular restriction is placed on the width (cross-sectional diameter) of the fibers, other than those based on manufacturing and use considerations. The width of the fiber can be essentially constant, or vary along its length. For many purposes, the fibers can have a largest cross-sectional diameter of 2 nanometers and larger, for example up to 2 centimeters, specifically from 5 nanometers to 1 centimeter. In an embodiment, the fibers can have a largest cross-sectional diameter of 5 to 500 micrometers, more particularly, 5 to 200 micrometers, 5 to 100 micrometers, 10 to 100 micrometers, 20 to 80 micrometers, or 40 to 50 micrometers. In one embodiment, the conductive fiber has a largest circular diameter of 40 to 45 micrometers. Further, no restriction is placed on the cross-sectional shape of the fiber. For example, the fiber can have a cross-sectional shape of a circle, ellipse, square, rectangle, or irregular shape.

U.S. Patent Application publication No. US2016/0315380, now U.S. Pat. No. 10,003,126 discloses suitable materials that can be used to prepare the conductive polymer fabric for the antenna, the relevant portions of which are reproduced below. U.S. Pat. No. 10,003,126 discloses stretchable organic metals, more specifically organic stretchable electrically conductive structures exhibiting metallic properties. The stretchable electrically conductive structures comprise a stretchable insulating substrate comprising nucleophile derivatized nanoparticles located at the surface of the stretchable insulating substrate and a conducting polymer:template polymer coating disposed on at least a portion of a surface of the stretchable insulating substrate through which a chemical bond forms between at least one anion of the template polymer and nucleophile derivatized nanoparticles located at the surface of the stretchable insulating substrate. The stretchable insulating substrate can be a stretchable fiber or stretchable fabric. It has been surprisingly found that the conducting polymer:template polymer coating of the stretchable electrically conductive structure has the ability to stretch along with the stretchable insulating substrate, whereas the conducting polymer alone will only tear. The stretchable electrically conductive structure has the ability to be stretched and retain its metal-like properties with respect to its temperature characteristics, ohmic behavior, and high charge carrier mobilities and concentrations.

In these structures, the coating of conducting polymer:template polymer material is phase separated such that there is a higher concentration of template polymer at the interface of the surface of the stretchable insulating substrate and the coating of conducting polymer:template polymer material. Not wishing to be bound by theory, it is proposed that a small amount of 'leaving group' or 'nucleophile' derivatized nanoparticle present at the surface of the stretchable insulating substrate reacts with the template polymer, e.g. polystyrenesulfonic acid, polyvinylphosphoric acid, etc. used as a counterion for the conducting polymer, to form covalent bonds at the particle surface that induce a phase segregation of the template polymer from the conducting polymer. This phase segregation generates a gradient of ratios of Template Polymer:Conducting Polymer, with the highest amount of Template Polymer:Conducting polymer occurring at the interface of the substrate and the Template Polymer:Conducting polymer film. Thus, there is a gradient by which most of the conducting polymer is at the surface of the film of conducting polymer:template polymer material, and away from the substrate surface. This nanoparticle induced phase separation, which leads to low sheet resistances, can be used to make organic wires and biopotential electrodes, having current carrying capacities approaching copper.

Figure 2:
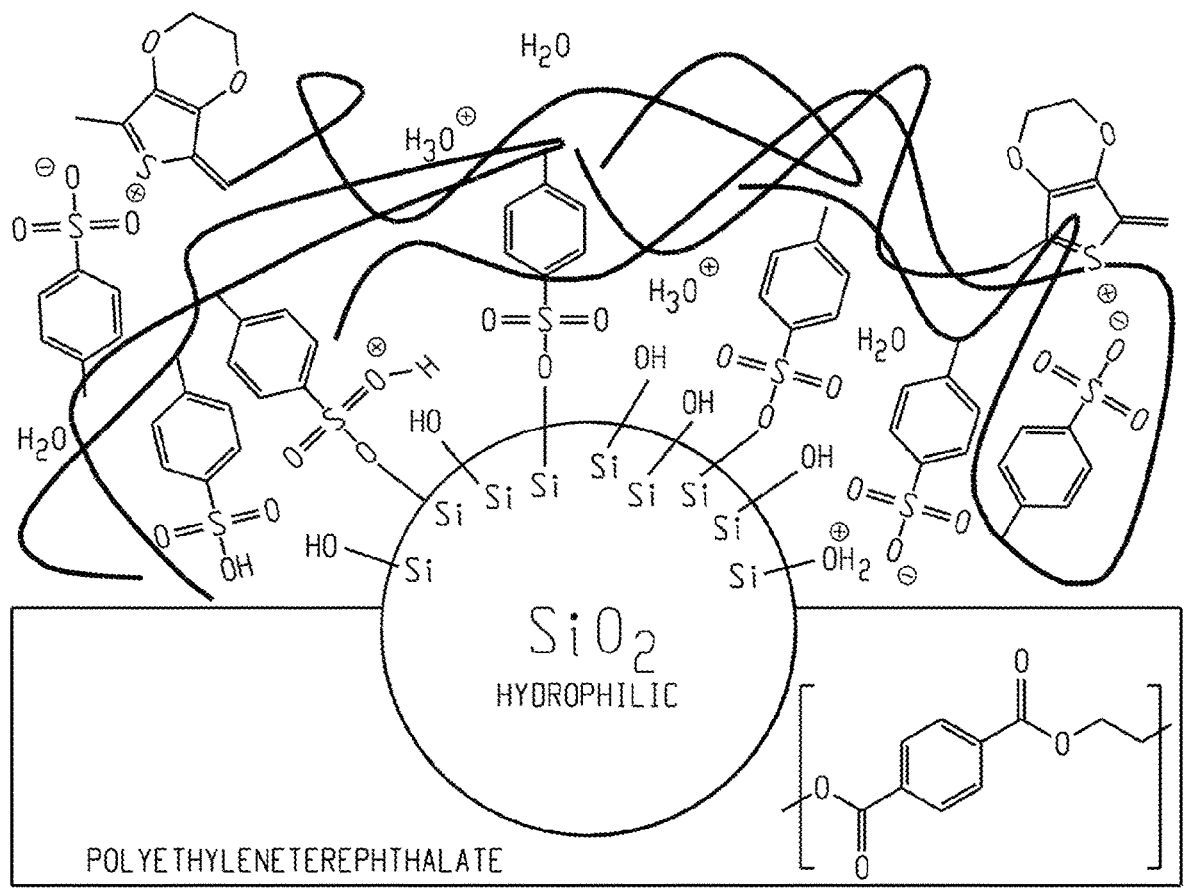
FIG. 2 is a schematic of the proposed phase segregation of PEDOT:PSS based on chemical reaction of the PSS with silica nanoparticles at the surface of a PET substrate.

FIG. 2 depicts the proposed phase segregation of PEDOT:PSS and is not to scale. The substrate is polyethyleneterephthalate (PET) comprising particles of silica at the surface (a single $SiO_2$ nanoparticle is shown). The PSS reacts with the Si—OH groups of the silica to form covalent bonds, thus resulting in a higher concentration of PSS at the interface of the PET substrate and PEDOT:PSS film and a higher concentration of PEDOT furthest from this interface. Not wishing to be bound by theory, but it is possible that the phase segregation occurs as the nucleophile derivatized nanoparticle is in a solid phase and the template polymer is in solution; and it is surprising that such a chemical reaction would take place and induce a phase separation phenomenon.

The stretchable electrically conductive structure exhibits certain mechanical properties, e.g. elasticity, as well as a certain ionic conductivity, even upon stretching and repeated stretching. The stretchable electrically conductive structure is both flexible and expandable owing to the stretchable insulating substrate.

Stretchability for a given material can be characterized by elongation at break and the ability of elastic recovery. Elastomeric material such as Spandex, have a large elongation at break value (up to about 800% to about 900%) and recover to their original form when the force is removed within a certain range. Different fabrics have different stretchability depending on the type, fiber/yarn diameter, fiber bundle, etc. In general, common fabrics, such as silk or cotton, have little to no stretchability as compared to Spandex. However, there are many commercially available products which contain small amount of Spandex (about 5-15%) that have sufficient stretchability for use as stretchable insulating substrates herein.

It has further surprisingly been found that the stretchable electrically conductive structure comprising the conducting polymer:template polymer coating is washable. "Washable" means that the stretchable electrically conductive structure has the ability to maintain functionality and not be damaged after being soaking in water or other suitable solvent with or without laundry detergent/soap and/or agitation, followed by an optional rinsing step and subsequent drying or removal of the solvent. In one embodiment, the washable stretchable electrically conductive structure further comprises a hydrophobic fabric treatment, for example Scotchgard™ Fabric & Upholstery Protector, perfluorinated alkylsulfonate (e.g. wherein the "alkyl" is a C4-C9), perfluorinated urethanes, and the like.

The stretchable insulating substrate can be a stretchable fiber or stretchable fabric comprising nucleophile derivatized nanoparticles located at least at the surface of the stretchable insulating substrate.

The stretchable fabric can be woven or non-woven fabric comprising fibers of stretchable polymeric material.

The stretchable insulating substrate can be a stretchable fiber or stretchable fabric. The stretchable insulating substrate comprises nucleophile derivatized nanoparticles at the substrate surface. The term "substrate comprising nucleophile derivatized nanoparticles at the substrate surface" is synonymous with the term "substrate comprising surface nucleophile derivatized nanoparticles". Further as used herein, the term "surface nucleophile derivatized nanoparticles" is synonymous with "surface nanoparticles".

Suitable stretchable insulating substrate materials include stretchable polymeric material. Exemplary stretchable polymeric material include polyurethane, polyester-polyurethane copolymer (e.g. Spandex), and blends of polyurethane or polyester-polyurethane and an additional synthetic organic polymer e.g., polyacrylic, polyamide (nylon), polycarbonate, polyether, polyester (e.g. polyethyleneterephthalate), polyethylene, polyimide, polyurethane, polyester-polyurethane copolymer, polyurea, polythiourea, polysiloxane, polyisoprene, polybutadiene, polyethylene oxide, polylactic acid blends thereof, copolymers thereof and the like. In another embodiment, fabrics prepared from a combination of stretchable fibers (e.g., polyester-polyurethane (Spandex)) fibers and other fibers (e.g. synthetic organic polymers or natural materials (e.g., cotton, silk, and wool)) can be used as long as the overall fabric is stretchable.

The nucleophile derivatized nanoparticles can be nanoparticulate inorganic oxide such as silica/silicon dioxide ($SiO_2$), titania/titanium dioxide ($TiO_2$), alumina/aluminum oxide, calcium oxide, amine functionalized nanoparticles, or a combination thereof. The nucleophile derivatized nanoparticles can have an average particle size of about 1 nanometer (nm) to about 1000 nm, specifically about 5 nm to about 500 nm, and more specifically about 10 nm to about 200 nm. In an embodiment, the nucleophile derivatized nanoparticles have an average particle size measured by transmission electron microscopy of about 10 nm, with a distribution of about 8 to about 12 nm.

The nucleophile derivatized nanoparticles can be present in an amount of about 0.01 to about 6.0 wt % by weight of the stretchable insulating substrate comprising nucleophile derivatized nanoparticles, specifically about 0.05 to about 5.0 wt %, and more specifically about 0.1 to about 4.0 wt % by weight of the stretchable insulating substrate comprising nucleophile derivatized nanoparticles.

The nucleophile derivatized nanoparticles can be present on the surface of the stretchable insulating substrate in an amount of about 0.01 to about 6.0% area relative to the total surface area of the stretchable insulating substrate comprising nucleophile derivatized nanoparticles, specifically about 0.05 to about 5.0% area, and more specifically about 0.1 to about 4.0% area relative to the total surface area of the stretchable insulating substrate comprising nucleophile derivatized nanoparticles.

The stretchable insulating substrate comprising surface nucleophile derivatized nanoparticles can be of any thickness. For those applications that require flexibility and/or stretchability, the thickness of the stretchable insulating substrate comprising surface nucleophile derivatized nanoparticles can be about 100 nm to about 1 centimeter (cm), specifically about 500 nm to about 0.1 cm, more specifically about 1 micrometer to about 5 millimeter (mm). In an embodiment, a stretchable insulating substrate can have a thickness of about 1 micrometer to about 5 mm.

The nucleophile derivatized nanoparticles can be present at the substrate surface in a random pattern or an organize pattern or design. The nucleophile derivatized nanoparticles are present at least embedded at the surface of the substrate where at least a portion of the nanoparticle is exposed, and optionally further distributed within the substrate material itself.

Nucleophile derivatized nanoparticles are incorporated into the stretchable insulating substrate such that the nanoparticles are exposed to the surface. Treatment, such as plasma treatment, can further expose the nanoparticles as well as generate a more polar polymer surface. Plasma treatment can be conducted using processes and process conditions well known in the art. The nucleophile derivatized nanoparticle serves as nucleation sites and allow growth or have segregation better achieved by polarity induced on polymer due to plasma treatment.

To form the substrate comprising surface nucleophile derivatized nanoparticles, the nanoparticles can be incorporated into a substrate material any number of ways. In one embodiment, the substrate material is combined with nanoparticles at or slightly above the melt temperature of the substrate material and blended with high shear to ensure no clustering of the nanoparticles. The resulting melt can be processed via conventional melt processing, melt spinning, and/or extrusion techniques known in the art.

In another embodiment, the nanoparticles can be applied to a substrate via a deposition technique. For example, silica nanoparticles having exposed hydroxyl functionality could be 'blown' onto a PET/Spandex substrate, and then the nanoparticles could undergo a transesterification with the PET that would covalently link the silica particles and anchor them to the PET/Spandex substrate surface.

The conducting polymer film structure comprises a conducting polymer:template polymer film disposed on at least a portion of the surface of the stretchable insulating substrate comprising surface nucleophile derivatized nanoparticles. In an alternative embodiment, the conducting polymer:template polymer coating is in the form of a pattern on at least a portion of the surface of the stretchable insulating substrate.

A conducting polymer:template polymer coating can be formed on the stretchable insulating substrate comprising surface nanoparticles using any variety of techniques known in the art. For example, a PEDOT-PSS film can be formed by using solution processing techniques. The stretchable insulating substrate can be soaked with a dispersion of PEDOT-PSS in a suitable solvent followed by drying and/or annealing. Other suitable processes include drop casting, tape casting, flow coating, spray coating, etc. The annealing can be conducted at temperatures of about 80 to about 130° C., specifically about 90 to about 125° C., and yet more specifically about 100 to about 120° C. for as long as needed. Such conditions can be carried out in an oven or other suitable apparatus with or without vacuum or air flow.

Electrically conducting polymers that can be used as the organic conductor material of the metal-free antenna systems are known in the art and are often complexed with a template polymer, e.g. polystyrenesulfonic acid, polyvinylphosphoric acid, etc. where the sulfate or phosphonate, etc. serve as the counterion for the conducting polymer that possess positive charges as the charge carrier.

Conducting polymers include those conducting polymers comprising units of conducting monomers, e.g. where the conducting polymer is prepared by template polymerization. Examples of suitable conducting monomers include those known in the art to exhibit electroactivity when polymerized, including but not limited to thiophene, substituted thiophene, 3,4-ethylenedioxythiophene, thieno[3,4-b]thiophene, substituted thieno[3,4-b]thiophene, dithieno[3,4-b:3', 4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, the monomers disclosed herein as structures (I)-(XXIX), combinations thereof, and the like.

Suitable conducting monomers include 3,4-ethylenedioxythiophene, 3,4-ethylenedithiathiophene, 3,4-ethylenedioxypyrrole, 3,4-ethylenedithiapyrrole, 3,4-ethylenedioxyfuran, 3,4-ethylenedithiafuran, and derivatives having the general structure (I):

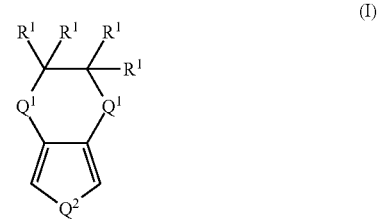

wherein each occurrence of $Q^1$ is independently S or O; $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $R^1$ is hydrogen. In one embodiment, each $Q^1$ is O and $Q^2$ is S. In another embodiment, each $Q^1$ is O, $Q^2$ is S, and one $R^1$ is $C_1$-$C_{12}$ alkyl, $C_1$-$C_{12}$ alkyl-OH, $C_1$-$C_{12}$ haloalkyl, $C_1$-$C_{12}$ alkoxy, $C_1$-$C_{12}$ haloalkoxy, —$C_1$-$C_6$ alkyl-O—$C_1$-$C_6$ alkyl, while the remaining $R^1$ are hydrogen. In another embodiment, each $Q^1$ is O, $Q^2$ is S, and one $R^1$ is $C_1$ alkyl-OH, while the remaining $R^1$ are hydrogen. A specific conducting monomer is EDOT.

Another suitable conducting monomer includes an unsubstituted and 2- or 6-substituted thieno[3,4-b]thiophene and thieno[3,4-b]furan having the general structures (II), (III), and (IV):

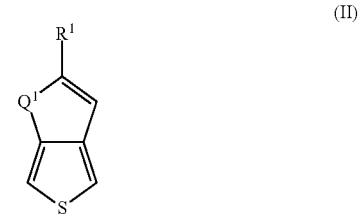

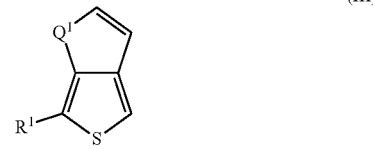

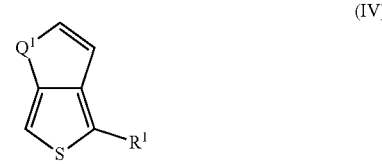

wherein $Q^1$ is S, O, or Se; and $R^1$ is hydrogen, $C_1$-$C_{12}$ alkyl, $C_1$-$C_{12}$ haloalkyl including perfluoroalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, $Q^1$ is S and $R^1$ is hydrogen. In another embodiment, $Q^1$ is O and $R^1$ is hydrogen. In yet another embodiment, $Q^1$ is Se and $R^1$ is hydrogen.

Another suitable conducting monomer includes substituted 3,4-propylenedioxythiophene (ProDOT) monomers according to the general structure (V):

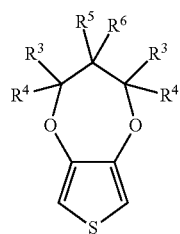

(V)

wherein each instance of $R^3$, $R^4$, $R^5$, and $R^6$ independently is hydrogen; optionally substituted $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, —$C_1$-$C_{10}$ alkyl-aryl; or hydroxyl. The $C_1$-$C_{20}$ alkyl, $C_1$-$C_{20}$ haloalkyl, aryl, $C_1$-$C_{20}$ alkoxy, $C_1$-$C_{20}$ haloalkoxy, aryloxy, —$C_1$-$C_{10}$ alkyl-O—$C_1$-$C_{10}$ alkyl, —$C_1$-$C_{10}$ alkyl-O-aryl, or —$C_1$-$C_{10}$ alkyl-aryl groups each may be optionally substituted with one or more of $C_1$-$C_{20}$ alkyl; aryl; halogen; hydroxyl; —N—$(R^2)_2$ wherein each $R^2$ is independently hydrogen or $C_1$-$C_6$ alkyl; cyano; nitro; —COOH; —S(=O) $C_0$-$C_{10}$ alkyl; or —S(=O)$_2C_0$-$C_{10}$ alkyl. In one embodiment, $R^5$ and $R^6$ are both hydrogen. In another embodiment, $R^5$ and $R^6$ are both hydrogen, each instance of $R^3$ independently is $C_1$-$C_{10}$ alkyl or benzyl, and each instance of $R^4$ independently is hydrogen, $C_1$-$C_{10}$ alkyl, or benzyl. In another embodiment, $R^5$ and $R^6$ are both hydrogen, each instance of $R^3$ independently is $C_1$-$C_5$ alkyl or benzyl and each instance of $R^4$ independently is hydrogen, $C_1$-$C_5$ alkyl, or benzyl. In yet another embodiment, each instance of $R^3$ and $R^4$ are hydrogen, and one of $R^5$ and $R^6$ is hydroxyl while the other is hydrogen.

Other suitable conducting monomers include pyrrole, furan, thiophene, and derivatives having the general structure (VI):

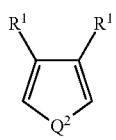

(VI)

wherein $Q^2$ is S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include isathianaphthene, pyridothiophene, pyrizinothiophene, and derivatives having the general structure (VII):

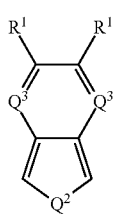

(VII)

wherein $Q^2$ is S, O, or N—$R^2$ wherein $R^2$ is hydrogen or $C_1$-$C_6$ alkyl; each occurrence of $Q^3$ is independently CH or N; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other conducting monomers include oxazole, thiazole, and derivatives having the general structure (VIII):

(VIII)

wherein $Q^1$ is S or O.

Additional conducting monomers include the class of compounds according to structure (IX):

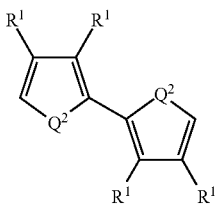

(IX)

wherein $Q^2$ is S, O, or N—$R^2$ wherein $R^2$ is hydrogen or $C_1$-$C_6$ alkyl; and each occurrence of $Q^1$ is independently S or O.

Additional conducting monomers include bithiophene, bifuran, bipyrrole, and derivatives having the following general structure (X):

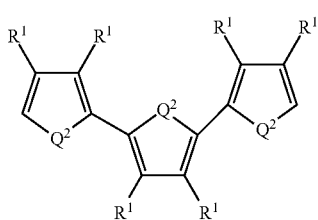

(X)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Conducting monomers include terthiophene, terfuran, terpyrrole, and derivatives having the following general structure (XI):

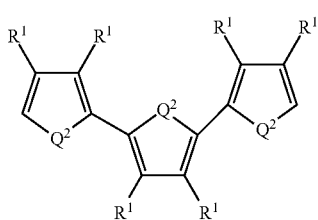

(XI)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include thienothiophene, thienofuran, thienopyrrole, furanylpyrrole, furanylfuran, pyrolylpyrrole, and derivatives having the following general structure (XII):

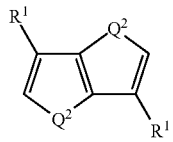

(XII)

wherein each occurrence of $Q^2$ is independently S, O, or N—$R^2$ wherein $R^2$ is hydrogen or $C_1$-$C_6$ alkyl; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Still other conducting monomers include dithienothiophene, difuranylthiophene, dipyrrolylthiophene, dithienofuran, dipyrrolylfuran, dipyrrolylpyrrole, and derivatives having the following general structure (XIII):

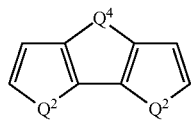

(XIII)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include dithienylcyclopentenone, difuranylcyclopentenone, dipyrrolylcyclopentenone and derivatives having the following general structure (XIV):

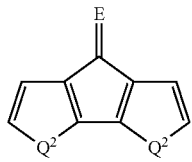

(XIV)

wherein each occurrence of $Q^2$ is independently S, O, or N—$R^2$ wherein $R^2$ is hydrogen or $C_1$-$C_6$ alkyl; and E is O or $C(R^7)_2$, wherein each occurrence of $R^7$ is an electron withdrawing group.

Other suitable conducting monomers include those having the following general structure (XV):

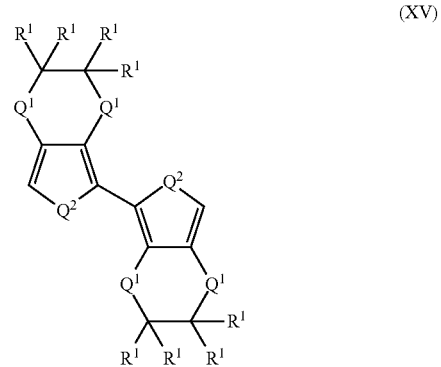

(XV)

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; and each occurrence of $R^1$ is hydrogen.

Additional conducting monomers include dithienovinylene, difuranylvinylene, and dipyrrolylvinylene according to the structure (XVI):

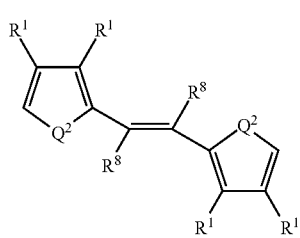

(XVI)

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Other conducting monomers include 1,2-trans(3,4-ethylenedioxythienyl)vinylene, 1,2-trans(3,4-ethylenedioxyfuranyl)vinylene, 1,2-trans(3,4ethylenedioxypyrrolyl)vinylene, and derivatives according to the structure (XVII):

(XVII)

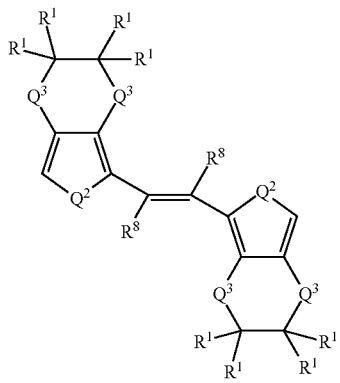

wherein each occurrence of $Q^3$ is independently $CH_2$, S, or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and each occurrence of $R^8$ is hydrogen, $C_1$-$C_6$ alkyl, or cyano.

Additional conducting monomers include the class bis-thienylarylenes, bis-furanylarylenes, bis-pyrrolylarylenes and derivatives according to the structure (XVIII):

(XVIII)

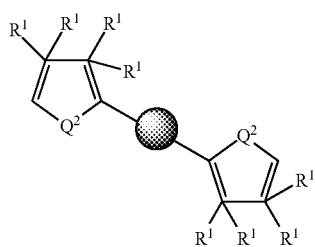

wherein each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl. Exemplary aryl groups include furan, pyrrole, N-substituted pyrrole, phenyl, biphenyl, thiophene, fluorene, 9-alkyl-9H-carbazole, and the like.

Other conducting monomers include the class of bis(3,4 ethylenedioxythienyl)arylenes, related compounds, and derivatives according to the structure (XIX):

(XIX)

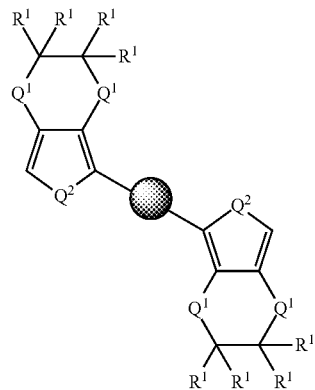

wherein each occurrence of $Q^1$ is independently S or O; each occurrence of $Q^2$ is independently S, O, or N—$R^2$ wherein $R^2$ is hydrogen or $C_1$-$C_6$ alkyl; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

represents an aryl.

Other exemplary conducting monomers include bis(3,4 ethylenedioxythienyl)arylenes according to structure (XIX) includes the compound wherein all $Q^1$ are O, both $Q^2$ are S, all $R^1$ are hydrogen, and

is phenyl linked at the 1 and 4 positions. Another exemplary compound is where all $Q^1$ are O, both $Q^2$ are S, all $R^1$ are hydrogen, and

is thiophene linked at the 2 and 5 positions.

Additional conducting monomers include the class of compounds according to structure (XX):

(XX)

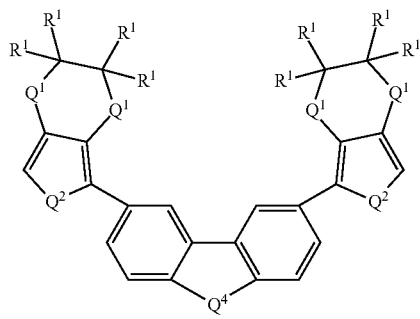

wherein each occurrence of $Q^1$ is independently S or O; each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, each occurrence of $Q^1$ is O; each occurrence of $Q^2$ is S; each occurrence of $R^1$ is hydrogen; and $R^2$ is methyl.

Still other conducting monomers include the class of compounds according to structure (XXI):

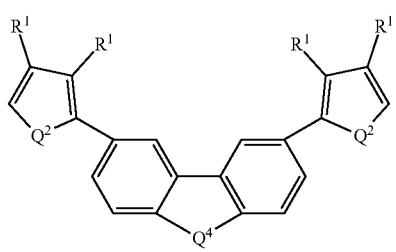

(XXI)

wherein each occurrence of $Q^2$ is independently S, O, or N—$R^2$ wherein $R^2$ is hydrogen or $C_1$-$C_6$ alkyl; $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include the class of compounds according to structure (XXII):

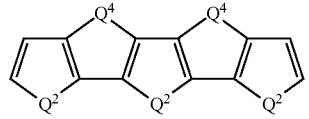

(XXII)

wherein each occurrence of $Q^2$ is independently S, O, or N—$R^2$ wherein $R^2$ is hydrogen or $C_1$-$C_6$ alkyl; each occurrence of $Q^4$ is $C(R^1)_2$, S, O, or N—$R^2$; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Other exemplary monomers include the class of compounds according to structure (XXIII):

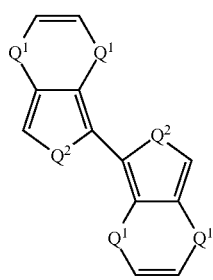

(XXIII)

wherein each occurrence of $Q^2$ is independently S, O, or N—$R^2$ wherein $R^2$ is hydrogen or $C_1$-$C_6$ alkyl; and each occurrence of $Q^1$ is independently S or O.

Exemplary conducting monomers include the class of compounds according to structure (XXIV):

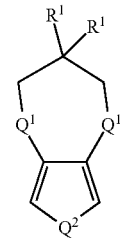

(XXIV)

wherein $Q^2$ is S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-aryl, —$C_1$-$C_6$ alkyl-O-aryl, or —$C_1$-$C_6$ alkyl-O-aryl. In one embodiment, one $R^1$ is methyl and the other $R^1$ is benzyl, —$C_1$-$C_6$ alkyl-O-phenyl, —$C_1$-$C_6$ alkyl-O-biphenyl, or —$C_1$-$C_6$ alkyl-biphenyl.

Additional conducting monomers include the class of compounds according to structure (XXV):

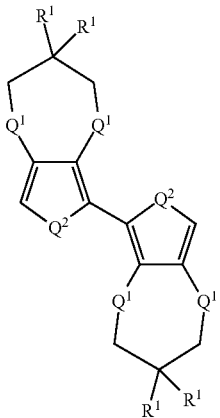

(XXV)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Other conducting monomers include the class of compounds according to structure (XXVI):

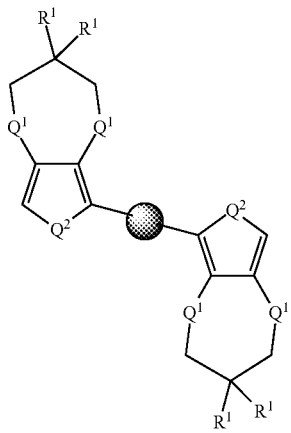

(XXVI)

wherein each occurrence of $Q^2$ is independently S, O, or N—$R^2$ wherein $R^2$ is hydrogen or $C_1$-$C_6$ alkyl; each occurrence of $Q^1$ is independently S or O; each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl; and

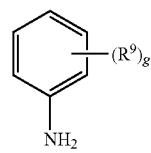

represents an aryl. In one embodiment, one $R^1$ is methyl and the other $R^1$ is —$C_1$-$C_6$ alkyl-O-phenyl or —$C_1$-$C_6$ alkyl-O-biphenyl per geminal carbon center.

Exemplary conducting monomers include the class of compounds according to structure (XXVII):

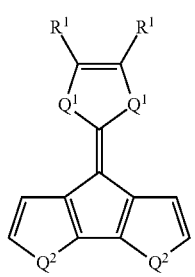

(XXVII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Additional conducting monomers include the class of compounds according to structure (XXVIII):

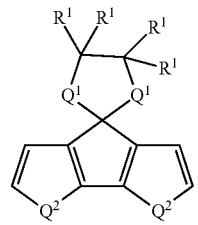

(XXVIII)

wherein each occurrence of $Q^2$ is independently S, O, or N—$R^2$ wherein $R^2$ is hydrogen or $C_1$-$C_6$ alkyl; each occurrence of $Q^1$ is independently S or O; and each occurrence of $R^1$ is independently hydrogen, $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, or —$C_1$-$C_6$ alkyl-O-aryl.

Another conducting monomer includes aniline or substituted aniline according to structure (XXIX):

(XXIX)

wherein g is 0, 1, 2, or 3; and each occurrence of $R^9$ is independently $C_1$-$C_{12}$ alkyl, $C_1$-$C_{12}$ haloalkyl, $C_1$-$C_{12}$ alkoxy, $C_1$-$C_{12}$ haloalkoxy, aryl, —$C_1$-$C_6$ alkyl-O—$C_1$-$C_6$ alkyl, —$C_1$-$C_6$ alkyl-O-aryl, or N—$R^2$ wherein $R^2$ is hydrogen or $C_1$-$C_6$ alkyl.

The number average molecular weight (Mc) of the conducting polymer can be in the range from about 1,000 to about 40,000, specifically from about 2000 to about 30,000.

The template polymerization may be conducted using a single type of conducting monomer to form a homopolymer, or two or more conducting monomer types in a copolymerization process to form a conducting copolymer. As used herein "conducting polymer" is inclusive of conducting homopolymers and conducting copolymers unless otherwise indicated. Furthermore, in one embodiment, the template polymerization may be conducted with a mixture of conducting monomers and nonconducting monomers as long as the resulting copolymer is conductive. As used herein, "conducting polymer" and "conductive polymer" are used interchangeably.

Exemplary conducting polymer include polyacetylene (PA), polythiophene (PT), poly(3-alkyl)thiophene (P3AT where the alkyl is methyl, butyl, etc.), polypyrrole (PPy), polyisothianapthene (PITN), polyethylene dioxythiophene (PEDOT), polyparaphenylene vinylene (PPV), poly-(2,5-dialkoxy)paraphenylene vinylene (e.g., MEH-PPV), polyparaphenylene (PPP), ladder-type polyparaphenylene (LPPP), polyparaphenylene sulphide (PPS), and the like.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, "—CHO" is attached through carbon of the carbonyl group.

Unless otherwise indicated, the term "substituted" as used herein means replacement of one or more hydrogens with one or more substituents. Suitable substituents include, for example, hydroxyl, $C_6$-$C_{12}$ aryl, $C_3$-$C_{20}$ cycloalkyl, $C_1$-$C_{20}$ alkyl, halogen, $C_1$-$C_{20}$ alkoxy, $C_1$-$C_{20}$ alkylthio, $C_1$-$C_{20}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, amido, or carbamoyl.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

As used herein "haloalkyl" indicates both branched and straight-chain alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Haloalkoxy" indicates a haloalkyl group as defined above attached through an oxygen bridge.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, naphthyl, including 1-naphthyl and 2-naphthyl, and bi-phenyl.

As used herein "heteroaryl" indicates aromatic groups containing carbon and one or more heteroatoms chosen from N, O, and S. Exemplary heteroaryls include oxazole, pyridine, pyrazole, thiophene, furan, isoquinoline, and the like. The heteroaryl groups may be substituted with one or more substituents.

As used herein, "halo" or "halogen" refers to fluoro, chloro, bromo, or iodo.

As used herein, "arylene" includes any divalent aromatic hydrocarbon or two or more aromatic hydrocarbons linked by a bond, a heteroatom (e.g., 0, S, S(=O), S(=O)2, etc.), a carbonyl group, an optionally substituted carbon chain, a carbon chain interrupted by a heteroatom, and the like.

Poly(3,4-ethylenedioxythiophene) (PEDOT) is a known conducting polymer exhibiting high conductivity, ranging from 10-2 to 103 S/cm. As PEDOT is insoluble in many common solvents, it is prepared by template polymerization with a polyanion, such as poly(styrene sulfonic acid) (PSSA). PSSA is a charge-balancing dopant during polymerization in water which allows for the formation of a colloidal dispersion of poly(3,4-ethylenedioxythiophene)-poly(styrenesulfonic acid) or PEDOT-PSS. PEDOT-PSS is commercially available and has desirable properties, such as high stability in the p-doped form, high conductivity, good film formation, and excellent transparency in the doped state. PEDOT-PSS dispersed in water can be spin-coated to result in transparent films.

The template polymer is typically a polyanion, comprising suitable functional groups to be a counterion to the conducting polymer. Suitable functional groups include sulfonic acid, phosphonic acid, and the like, or a combination thereof. The deprotonated sulfuric acid (sulfonate) serves as the negative ion to counterbalance the positive charge carrier on PEDOT.

Other conducting polymers include the conducting polymer-sulfonated poly(imide) complexes and conducting polymer-sulfonated poly(amic acid) complexes described in U.S. Pat. No. 8,753,542B2 to Sotzing which is incorporated by reference herein in its entirety.

The conducting polymer that is used to make the radiating element/antenna of the flexible antenna system can be provided as a conducting polymer:template polymer film disposed on a fabric, specifically a stretchable insulating substrate comprising surface nucleophile derivatized nanoparticles. The conducting polymer:template polymer film can be cast onto the surface of the substrate comprising surface nanoparticles from solutions or dispersions comprising the conducting polymer:template polymer and optionally a surfactant in a suitable solvent using techniques known in the art. Suitable solvents for forming a cast film of conducting polymer:template polymer film depends upon the material. The solvent can be an organic solvent or combination of an organic solvent and water, specifically deionized water. Exemplary organic solvents include dichloromethane (DCM), dimethyl sulfoxide (DMSO), toluene, N,N-dimethyl formamide (DMF), propylene glycol monomethyl ether acetate (PGMEA), propylene glycol monomethyl ether (PGME), acetone, methanol, ethanol, tetrahydrofuran (THF), dimethylacetamide (DMAC), ethyl acetate and trifluoroacetic acid.

Suitable casting or coating processes to form the conducting polymer:template polymer film include screen printing, drop casting, spin coating, ink jetting, spray coating, dip coating, flow coating, dye casting and the like, or a combination thereof. In one embodiment, the conducting polymer: template polymer film covers at least a portion of a surface of the stretchable insulating substrate comprising surface nanoparticles. In another embodiment, the conducting polymer:template polymer film is applied to the surface of the stretchable insulating substrate comprising surface nanoparticles in the form of a pattern of any design. Exemplary patterning can be achieved by screen printing, and the like.

After the conducting polymer:template polymer coating has been applied to the surface of the stretchable insulating substrate comprising surface nanoparticles solvent can be removed, if used, and the coating can be annealed. The annealing can be conducted at temperatures of about 80 to about 130° C., specifically about 90 to about 125° C., and yet more specifically about 100 to about 120° C. for as long as needed. Such conditions can be carried out in an oven or other suitable apparatus with or without vacuum or air flow.

The thickness of the conducting polymer:template polymer film can be about to about 40 nm to about 1 micrometer, specifically about to about 80 nm to about 500 nm, and more specifically about 100 nm to about 300 nm.

In an embodiment, the stretchable electrically conductive structure further comprises a conductive organic particle. In an embodiment, the conductive organic particle can be disposed between the stretchable insulating substrate and the conducting polymer:template polymer coating.

The conductive organic particle can be graphene, graphite, a combination of graphene and graphite, carbon nanotubes, buckyballs, "n-type" small molecules, or a combination thereof. Exemplary "n-type" small molecules include those commercially available from Sigma-Aldrich, including 2,9-bis[2-(4-chlorophenyl)ethyl]anthra[2,1,9-def:6,5,10-d'e'f']diisoquinoline-1,3,8,10(2H,9H)tetrone; N,N'-bis(2,5-di-tert-butylphenyl)-3,4,9,10-perylenedicarboximide; 2,9-bis[2-(4-fluorophenyl)ethyl]anthra[2,1,9-def:6,5,10-d'e'f']diisoquinoline-1,3,8,10(2H,9H)tetrone; 2,9-bis[(4-methoxyphenyl)methyl]anthra[2,1,9-def:6,5,10-d'e'f']diisoquinoline-1,3,8,10(2H,9H)tetrone; N,N'-bis(3-pentyl)perylene-3,4,9,10-bis(dicarboximide); 5,5'''-bis(tridecafluorohexyl)-2,2':5',2'':5'',2'''-quaterthiophene; 2,2'-bis[4-(trifluoromethyl)phenyl]-5,5'-bithiazole; 5,10,15,20-tetraphenylbisbenz[5,6]indeno[1,2,3-cd:1',2',3'-lm]perylene; 2,9-diheptylanthra[2,1,9-def:6,5,10-d'e'f']diisoquinoline-1,3,8,10(2H,9H)tetrone; 2,7-dihexylbenzo[lmn][3,8]phenanthroline-1,3,6,8(2H,7H)-tetrone; 4-(2,3-dihydro-1,3-dimethyl-1H-benzimidazol-2-yl)-N,N-dimethylbenzenamine; 4-(1,3-dimethyl-2,3-dihydro-1H-benzoimidazol-2-yl)-N,N-diphenylaniline; N, N'-dimethyl-3,4,9,10-perylenedicarboximide; N,N'-dioctyl-3,4,9,10-perylenedicarboximide; N,N'-dipentyl-3,4,9,10-perylenedicarboximide; [6.6] Diphenyl C62 bis(butyric acid methyl ester); N,N'-diphenyl-3,4,9,10-perylenedicarboximide; 2,9-dipropylanthra[2,1,9-def:6,5,10-d'e'f']diisoquinoline-1,3,8,10(2H,9H)tetrone; N,N'-ditridecylperylene-3,4,9,10-tetracarboxylic diimide; [5,6]-Fullerene-C70; Fullerene-C60; Fullerene-C84; 1',1'',4',4''-tetrahydro-di[1,4]methanonaphthaleno[1,2:2',3',56,60:2'',3''][5,6]fullerene-C60; 1',4'-Dihydro-naphtho[2',3':1,2][5,6]fullerene-C60; 1,4,5,8-naphthalenetetracarboxylic dianhydride; 1,2,3,4,5,6,7,8-octafluoro-9,10-bis[2-(2,4,6-trimethylphenyl)ethynyl]anthracene; perylene-3,4,9,10-tetracarboxylic dianhydride; [6,6]-phenyl-C61 butyric acid butyl ester; [6,6]-phenyl C61 butyric acid methyl ester; [6,6]-phenyl C71 butyric acid methyl ester; [6,6]-phenyl-C61 butyric acid octyl ester; 7,7,8,8-tetracyanoquinodimethane; 2,3,5,6-tetrafluoro-7,7,8,8-tetracyanoquinodimethane; 1,3,8,10(2H,9H)-tetraone, 2,9-bis(2-phenylethyl)anthra[2,1,9-def 6,5,10-d'e'f']diisoquinoline; 1,3,6,8(2H,7H)-tetraone, 2,7-dicyclohexylbenzo[lmn][3,8]phenanthroline; [6,6]-thienyl C61 butyric acid methyl ester; and the like; or a combination thereof.

In an embodiment, the conductive organic particle used is graphene, graphite, or a combination of graphene and graphite to form a graphene and/or graphite infused stretchable substrate. Pristine graphene can be prepared by exfoliating pristine graphite via sonification in an organic solvent and water to yield graphene flakes. Exemplary organic solvents that can be used in the exfoliating process include alkyl (e.g. n-heptane) and aromatic (e.g. o-dichlorobenzene) solvents.

The total amount of conductive organic particle in the stretchable substrate can be about 0.2 to about 20 wt %, specifically about 1.0 to about 16 wt %, and more specifically about 2.5 to about 13 wt % based on the total weight of the conductive organic particle infused stretchable substrate. The total amount of graphene and/or graphite infused in the stretchable substrate can be about 0.2 to about 20 wt %, specifically about 1.0 to about 16 wt %, and more specifically about 2.5 to about 13 wt % based on the total weight of the conductive organic particle infused stretchable substrate.

In an exemplary embodiment, the conductive organic particle is graphene, graphite, or a combination of graphene and graphite infused, for example, by an interfacial trapping method to form a graphene and/or graphite infused stretchable insulating substrate. The interfacial trapping method generally involves exfoliating pristine graphite via sonification in an organic solvent and water to yield graphene flakes. Exemplary organic solvents that can be used in the exfoliating process include alkyl (e.g. n-heptane) and aromatic (e.g. o-dichlorobenzene) solvents. A stretchable insulating substrate is then exposed to the sonicated mixture and sonicated to infuse the graphene and/or graphite into the stretchable insulating substrate followed by removal of the substrate and drying to form a graphene and/or graphite infused stretchable insulating substrate. In general, the weight/volume ratio of graphite to organic solvent is about 20 mg/mL and the weight/volume ratio of graphite to organic and aqueous solvent is about 10 mg/mL.

The stretchable electrically conducting substrate in the form of a fiber can be used as a fiber, or at least two fibers can be woven, knitted, crocheted, knotted, pressed, or plied to form a multi-filament fiber or fabric. In one embodiment, a plurality of stretchable electrically conducting fibers can be used to manufacture a woven or nonwoven fabric. While these fabrics are generally in the form of a 2-dimensional woven or nonwoven planar sheet, their enhanced flexibility and stretchability permits them to be shaped into 3-dimensional conformations such as a rolled sheet, a folded sheet, a twisted sheet, a coiled sheet, or other configuration.

The flexible metal-free antenna system can be incorporated in any type of garment, footwear, headwear, eyewear, wrist band, body/chest strap, belt, and the like to be worn on the body or as an accessory or implant for wireless communication. As the system is flexible and stretchable, it can be worn without loss of comfort. The flexible metal-free antenna system can be incorporated in a household textile product (carpet, wallpaper, curtains, etc.) or an automobile textile product (car interior, headrest, etc.). The antenna system can be used for data transfer (transmission and receiving) and/or as a sensor at, e.g., Wi-Fi frequency (approximately 2.5 GHz) or any frequency below. In an embodiment, the antenna system can be used in radar detection. The system can be used to track the movement of an object, including parts of the body (e.g. heart to determine heart rate; lungs to determine breathing), or foreign objects approaching the system (e.g., car, baseball, tree limb, bullet, etc.).

Disclosed herein are truly wearable organic patch antennas fabricated from screen printed poly (3,4-ethylenedioxy thiophene): polystyrene sulfonate (PEDOT:PSS) on fabric textiles. The combination of PEDOT:PSS and the fabric promotes the phase segregation and enhances the conductivity of PEDOT:PSS by forming a high-frequency Litz-wire-like structure that can minimize high frequency skin effect. The antenna of this embodiment has a resonant frequency of 2.35 GHz in the medical body-area network band. The antenna operates well under various flexed conditions and a Doppler radar was built to demonstrate its RF emission and object sensing capability.

The following illustrative examples are provided to further describe the invention and are not intended to limit the scope of the claimed invention.

EXAMPLES

Example 1. Metal-Free Fabric Antenna—PEDOT:PSS Patch Antenna

Materials:

PEDOT: PSS (CLEVIOS PH1000, a poly(3,4-ethylenedioxythiophene): poly(styrenesulfonate) aqueous dispersion) was obtained in a colloidal form (with a solid content of 1.25 wt %) from Heraeus. Dimethyl sulfoxide (DMSO) was obtained from Sigma Aldrich and used without any further purification. Nonwoven Polyethylene terephthalate (PET) was procured from JoAnn Fabrics.

Methods:

A formulation containing 95% CLEVIOS PH 1000 and 5% DMSO was prepared and concentrated to 40% of its original weight by evaporating water at 60° C. for 6 hours. The solid content of the formulation was measured using thermogravimetric analysis (TGA). Screen printing was carried out using a Speedball™ screen with a nylon mesh of mesh count 110, and the squeegee was held at 45° using a custom-made holder. The printing speed was approximately 50 mm/sec.

Antenna Design and Modeling:

The width W and the length L are designed based on the transmission line model. Standard calculation to determine the patch dimension is based on the resonant frequency $f_0$, dielectric constant of the substrate $\varepsilon_r$ and the height of the substrate h.

$$W = \frac{c}{sf_0 \sqrt{\frac{\varepsilon_r+1}{2}1}} \quad (1)$$

$$\varepsilon_{\it eff} = \frac{\varepsilon_r+1}{2} + \frac{\varepsilon_r-1}{2}\left[\frac{1}{\sqrt{1+\frac{12h}{W}}}\right] \quad (2)$$

$$L = \frac{c}{2f_0\sqrt{\varepsilon_{\it eff}}} - 0.824\left[\frac{(\varepsilon_{\it eff}+0.3)\left(\frac{W}{h}+0.264\right)}{(\varepsilon_{\it eff}-0.258)\left(\frac{W}{h}+0.8\right)}\right] \quad (3)$$

Here, the frequency is designed to be 2.4 GHz, the dielectric constant is measured to be around 1.9 at 2.4 GHz, and the height of the substrate is 2.4 mm.

Antenna Measurement:

The RF resistivity and the S-parameter were all measured with a VNA tiny portable vector network analyzer, the result includes resonant frequency, return loss and transmission loss, resistivity and phase angle. The transmission loss was measured with an identical copper antenna.

Doppler Radar System:

A high frequency signal is generated and fed into a splitter. Half of the signal is transmitted by the fabric antenna and the other half is used as one of the inputs of the mixer as a reference. The transmitted signal will get reflected by the object in front of the antenna and the reflected signal is picked up by the receiver antenna. This signal will be used as the other input of the mixer. Two inputs will be multiplied in the mixer and the output contains the information regarding the phase difference between the transmitted and received signals. When the object moves, the changing of the phase difference can be used to calculate the speed and the distance of the object based on Doppler effect.

Unlike most of the conductivity enhancement work which involved the formation of precisely controlled domains, the highly conductive PEDOT:PSS printed fabric in this study was achieved by a simple screen-printing method assisted automatically by nano-particles on the fabric substrate. This process requires much less effort and can be realized in mass production. A schematic diagram demonstrating the proposed phase segregation of PEDOT:PSS based on chemical reaction of the PSS with silica nanoparticles at the surface of a PET fabric substrate leading to conductivity enhancement is shown in FIG. 2. In PEDOT:PSS films, the polymer chains normally will relax and have an coiled shape in an amorphous form. Thus, the inter-chain interaction for electron hopping is limited, resulting in a limited conductivity. The PET fabric used in this work contains nanometer-size silica particles in the fibers. Upon the drying of the printed fabric, the solvent will reach extremely low pH level, resulting in the condensation reaction between the —OH group on the silica surface and excess sulfonic acid groups of the PSS. This reaction leads to the formation of covalent bond between the fabric and the conducting polymer. The formed sulfo-silyl ester linkage leads to aggregation of PEDOT chains on the surface of air-fabric interface resulting in a highly conductive printed fabric. In addition, the printing formulation contained an organic solvent DMSO that was used as secondary dopant to further promote the phase segregation of PEDOT:PSS and lower the sheet resistance.

Cross-sectional scanning electron microscopy (SEM) images of the printed fabric reveal that the fabric fibers formed fiber bundles, and the PEDOT:PSS printing layer is present around the fabric fiber. With a zoomed image, a uniform continuous thin coating along each single fiber and across fibers can be seen. The PEDOT conductive paths follow the fabric fibers, twisted and wound together, forming a unique three dimensional structure that is very similar to that of high frequency Litz wires. Litz wire is a type of multistrand cable used specifically under high frequency to eliminate skin effect and increase the apparent conductivity. With the template assisted PEDOT:PSS film forming, the conductive layer utilizes this unique structure of the fibers and showed further improved conductivity under high frequency. A comparison of resistance between copper sheet and the printed fabric was conducted. The printed fabric conducting surface showed very similar resistance as the copper sheet under radio frequency (RF).

Figure 4:
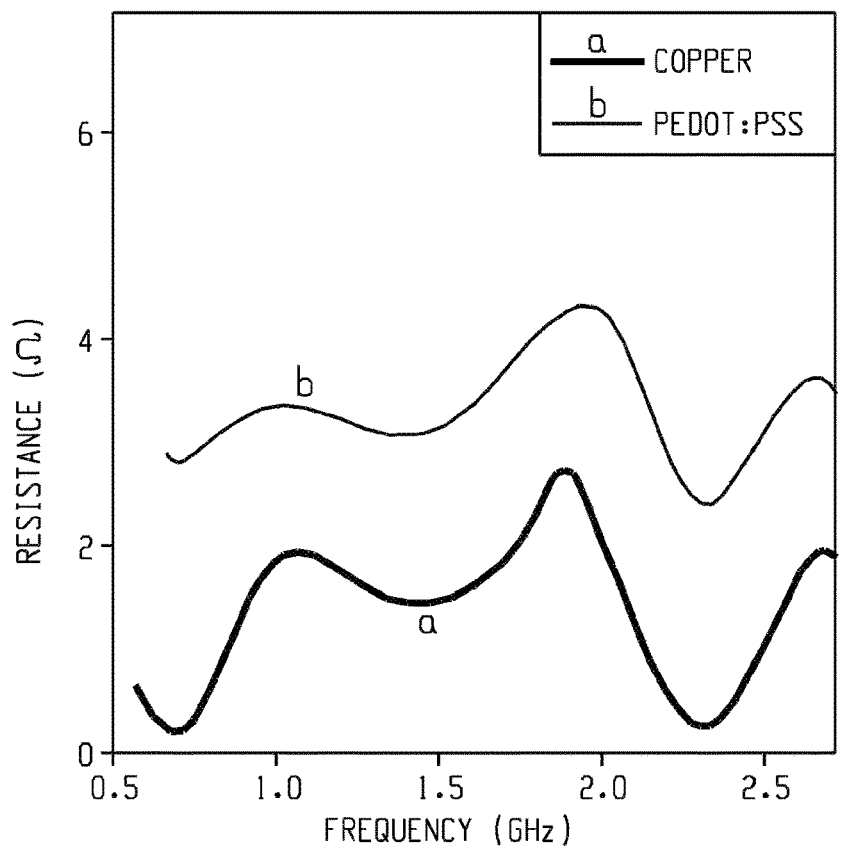
FIG. 4 illustrates the RF surface resistivity comparison between copper sheet and the PEDOT:PSS printed fabric.

The surface resistance of the PEDOT: PSS printed fabric is measured in comparison with a copper sheet by using a coaxial probe and a VNA. The resistance was measured from 0.5 to 3 GHz. The resistance of the PEDOT: PSS printed fabric is within the same order of magnitude of copper sheet in gigahertz range (FIG. 4), although copper has a much higher conductivity than PEDOT: PSS. This result shows the capability of the conductive fabric on replacing copper sheet in RF devices and applications.

Patch antenna, a typical type of low-profile RF voltage radiator based on fringing field coupling for signal transmitting/receiving, was employed in this study. Besides the ease of integration into clothing, patch antenna is preferred for wearable devices because its ground plane can protect human body from unwanted radiation, and provide detuning isolation from unwelcoming body environment. The antenna was designed for operation at 2.4 GHz within the industrial, scientific, and medical (ISM) band of BAN communication systems. This frequency also corresponds to the Bluetooth and Wi-Fi frequency for most of wireless applications. ANSYS HFSS simulation was conducted for optimal antenna design. The size of the antenna was calculated based on standard transmission line model to obtain the desired resonance frequency. ANSYS HFSS was used to simulate the S parameter and far field performance. The center pin of the SubMiniature version A (SMA) connector was fed through the fabric substrate and the position of the feed point was optimized for impedance matching.

The built model of the antenna in HFSS is shown in the general schematic of FIG. 3. FIG. 3 is a side view schematic of the patch antenna (10) with metal-free patch (50), ground plane (20), fabric as the substrate ((40); shown as three layers (41), (42), and (43)), and feed ((30), e.g. shown as center point of a SMA connector running through substrate (40) and patch (50). In this example, the ground plane (20) is PEDOT:PSS, the patch (50) is PEDOT:PSS that was screen printed on PET fabric as the substrate (40).

For the purpose of comparison and for a better understanding of the performance of this metal-free fabric antenna, a reference patch antenna, which has the same resonant frequency, was fabricated with conventional copper plated microwave substrate (Rogers Ultralam 2000). It has the same form factor as the fabric antenna. Details of the evolution from the copper antenna to the fabric antenna can be found in Example 2.

Figure 5:
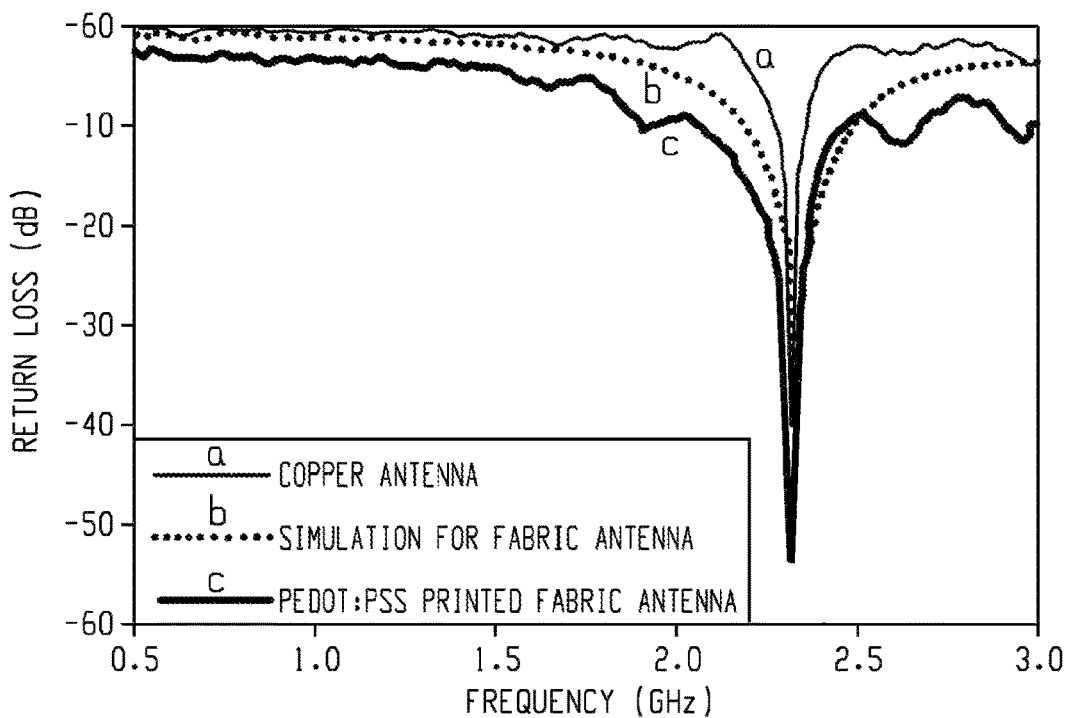
FIG. 5 illustrates the return loss comparison of an ideal prototype made from copper (a), simulated result of the organic fabric antenna (b), and experimental result from organic fabric antenna (c).

The fabric patch antenna was characterized experimentally by measuring its S-parameters using a VNA within a wide range of frequency under RF. The resonant peak determined by return loss parameter ($S_{11}$) corresponds to the frequency at which the antenna transmits and receives signal most-effectively, and the amplitude indicates the power loss caused by signal reflection and attenuation within the antenna. FIG. 5 shows the measured return loss spectrum for the fabric antenna from 0.5 GHz to 3 GHz, in comparison with the HFSS simulation and the reference copper antenna. The $S_{11}$ for the organic fabric patch antenna is below −50 dB at the resonant frequency of 2.35 GHz and above −3 dB far outside the operation range. And the bandwidth of the fabric antenna, which is defined as the frequency range with return loss<−10 dB, was 355 MHz. The resonant frequency of the copper antenna is at exact the same frequency of 2.35 GHz with a return loss below −30 dB. The measured results match well with the simulation.

Figure 6:
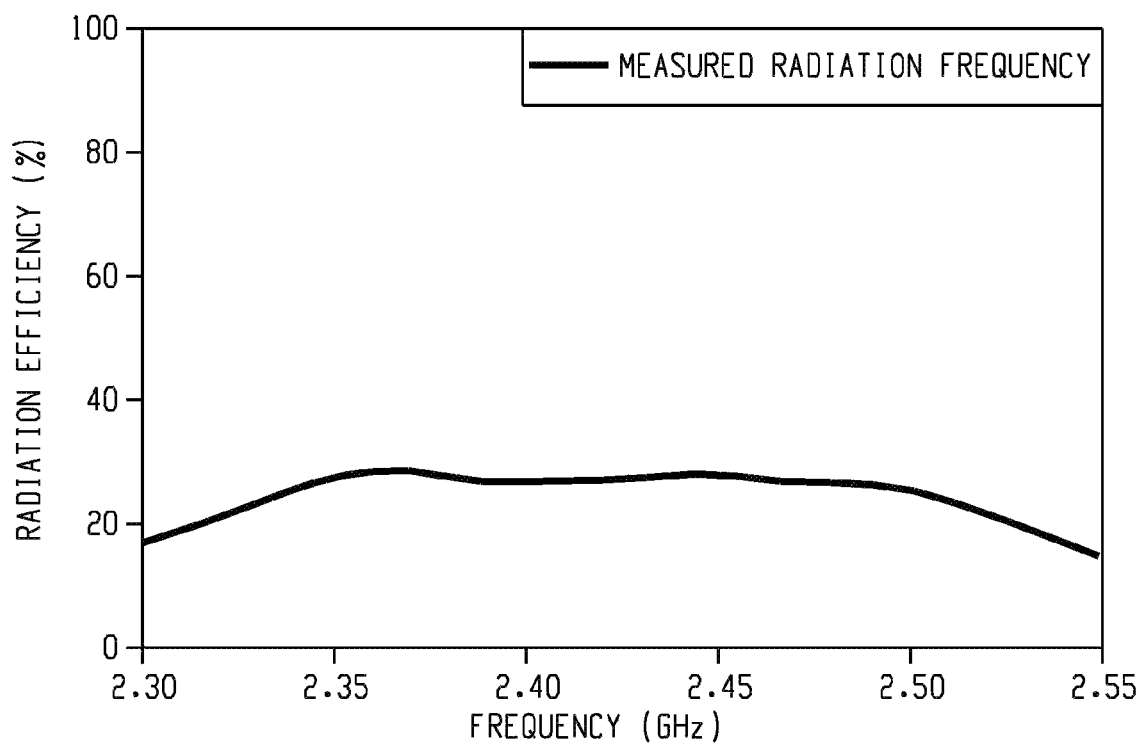
FIG. 6 is a schematic of the comparison of the transmission loss between the conventional copper antenna and the organic printed antenna.

The radiation efficiency was estimated by transmission coefficients ($S_{12}$) of the antenna measured in reciprocating configuration. In this measurement, the organic fabric antenna was connected to port 1 of the VNA as the transmitter and the reference copper patch antenna was connected to port 2 as an "ideal" receiver. The VNA measures the ratio of the energy received at port 2 over the energy sent out from port 1. Two antennas were set close to each other to reduce power loss to the free space. As shown in FIG. 6, the radiation efficiency is estimated to be ~28% around the resonant frequency base on $S_{12}$, and the result matches well with the simulated 25% efficiency by far field calculation (Table 1). This result also indicates that the effective RF sheet resistance of this printing is within the same order of magnitude of copper sheet.

Table 1 provides the simulation results of the fabric antenna.

TABLE 1

Simulation results of the fabric antenna.

| Resonant frequency | Peak Directivity | Peak Gain | Radiation Efficiency |
|---|---|---|---|
| 2.39 GHz | 4.86 dBi | 1.26 dBi | 25.93% |

Figure 7:
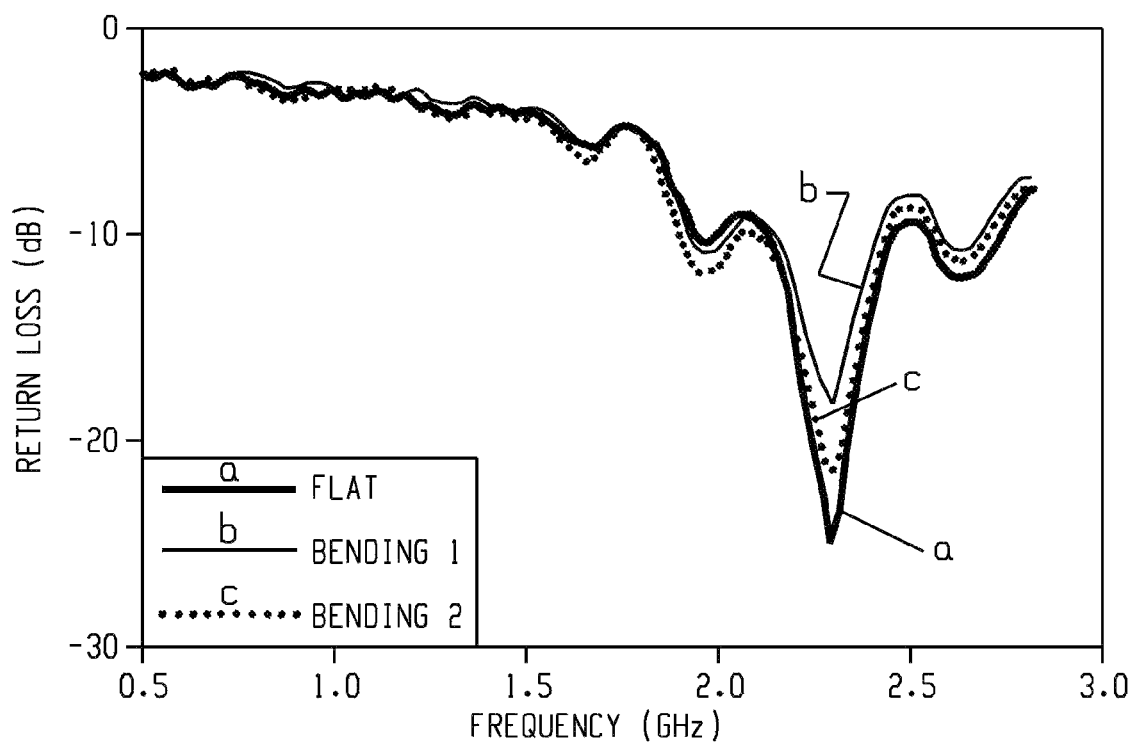
FIG. 7 illustrates the return loss comparison of the organic antenna under various deformations.

As a wearable device, the antenna will be deformed and fit onto human body surface. It is important for the fabric antenna that it can perform well even with certain level of deformation. To verify the flexibility of the fabric antenna, the reflection coefficient of the antenna with a bending radius of 95 mm was evaluated. The chosen curvature value is a typical value considering the normal radius of human thigh and torso. FIG. 7 shows the measured Sit under flat condition and two flexed conditions, i.e., bending in and bending out.

Figure 8B:
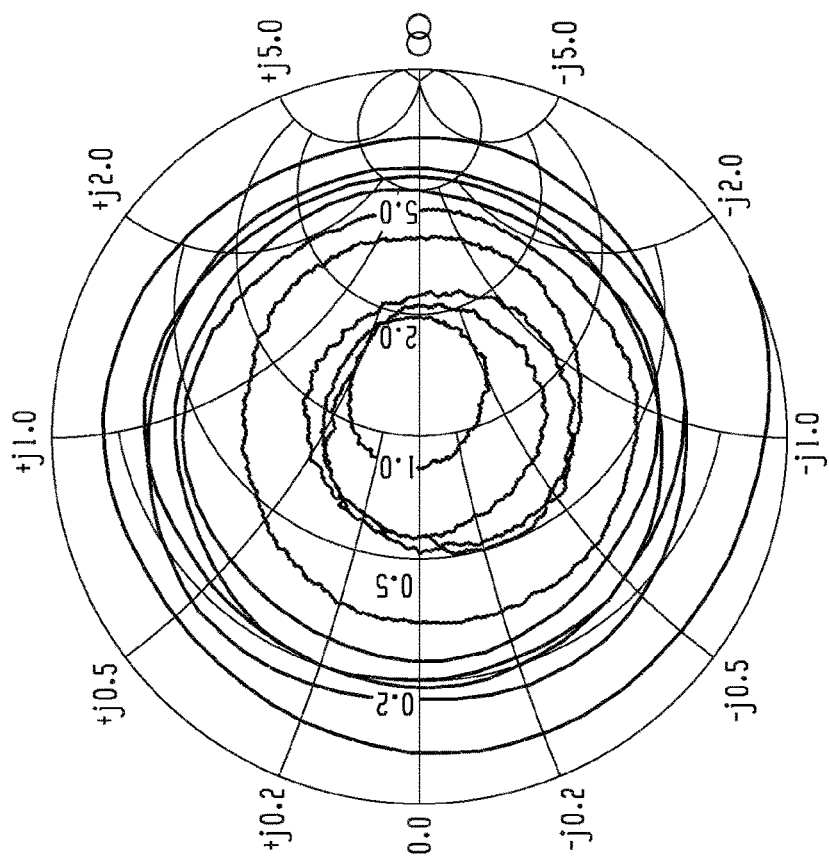
FIG. 8A, FIG. 8B, and FIG. 8C are Smith charts for the measurement of a metal-free antenna under various flexed conditions.
Figure 8A:
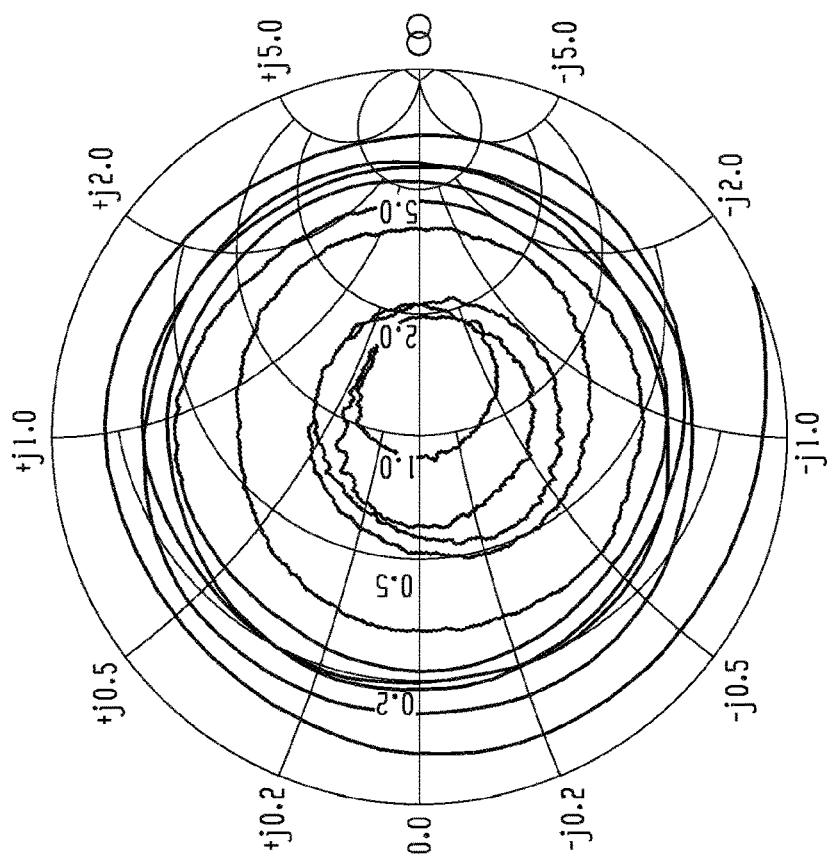
Figure 8C:
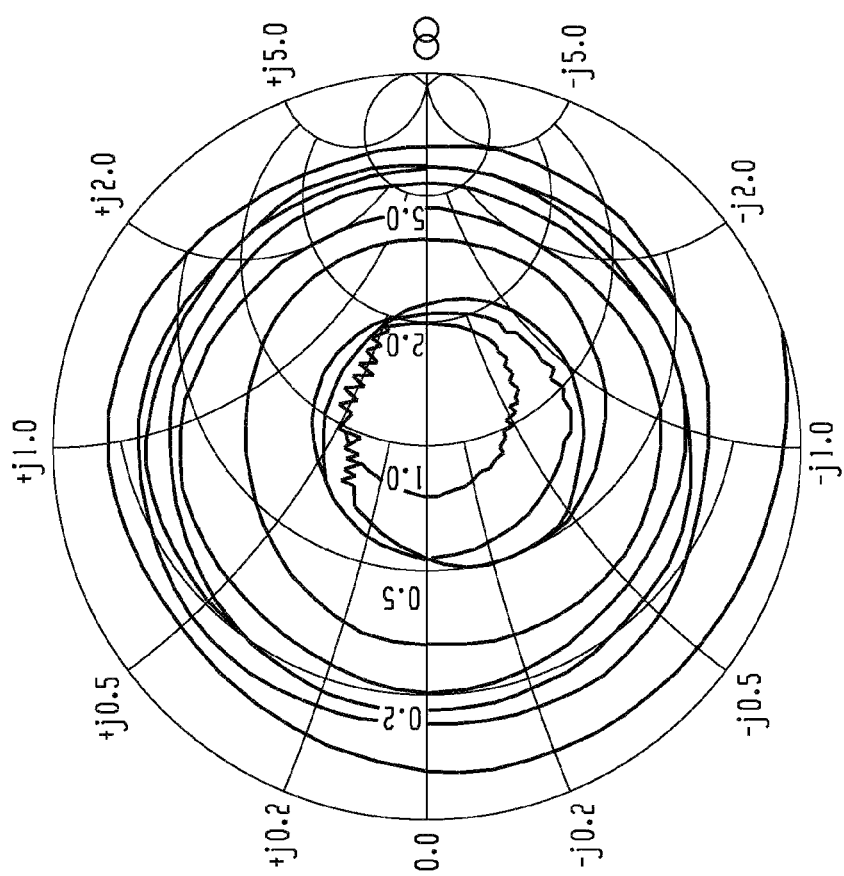

As the results show, the antenna performs well under bending deformation, because the resonant frequency is well maintained without frequency shift. According to the Smith Chart results (FIG. 8A, FIG. 8B, and FIG. 8C), the input impedance decreased slightly compared with the flat condition, leading to a slightly higher return loss. These changes on the return loss will not diminish the performance of the antenna. The comparison also indicates that the conductivity of this metal-free printed fabric is not affected under normal deformation.

Figure 9:
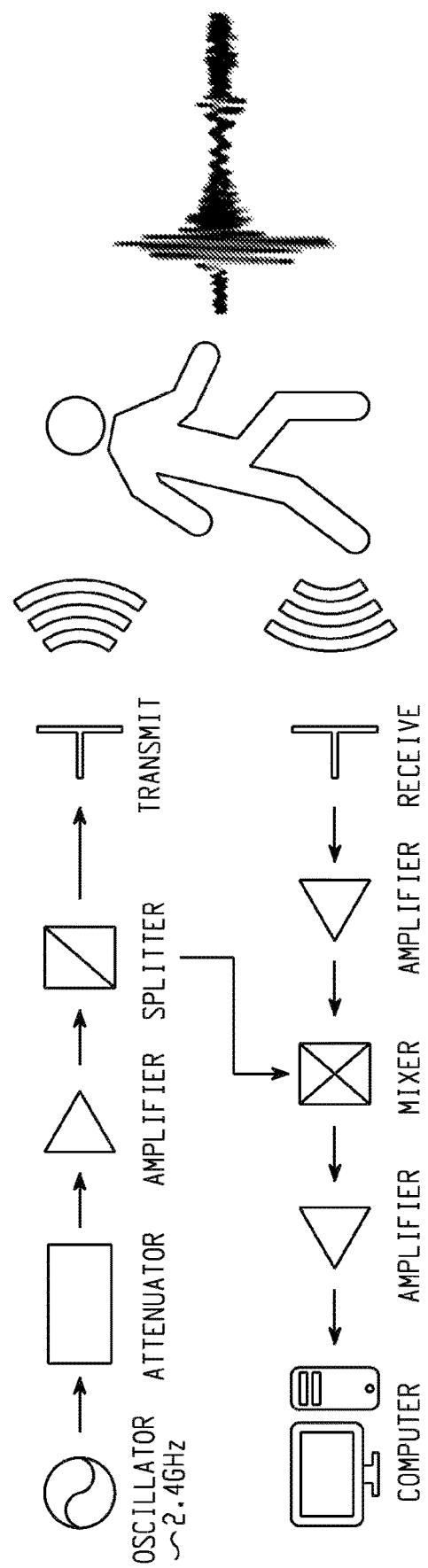
FIG. 9 is a schematic diagram of the Doppler radar system with organic patch antennas.
Figure 10A:
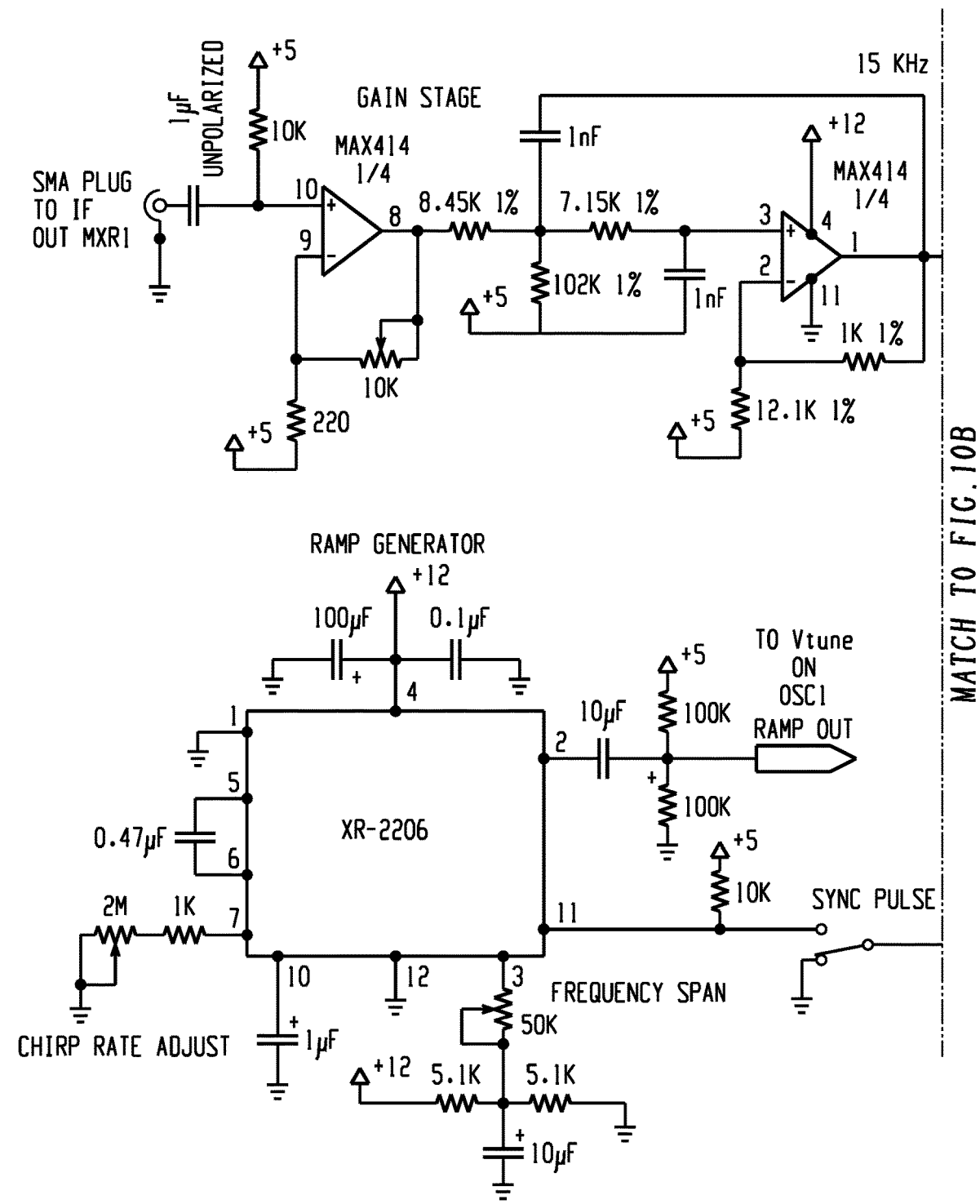
FIG. 10A and FIG. 10B combined is a schematic of a circuit diagram of a Doppler radar system.
Figure 10B:
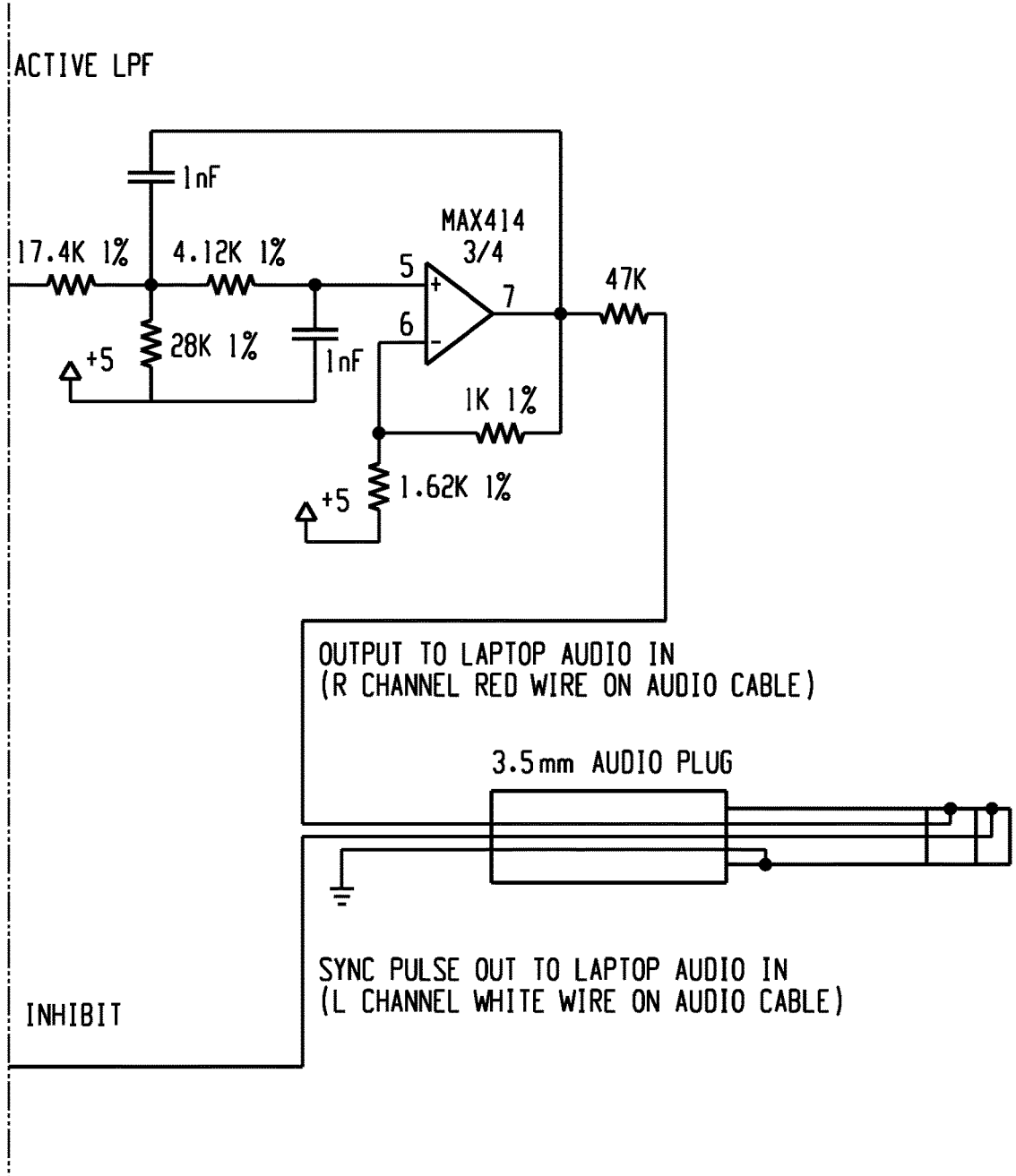

Furthermore, inspired by the short range sensing devices for blind assist, the antenna was put into a Doppler radar system to showcase the signal carrying capability. As shown in the system diagram in FIG. 9, fabric antennas were used to transmit high frequency signals and receive the reflected signals. Signals are processed by the RF circuit according to Doppler effect and analyzed in a PC with open source MATLAB script to measure the speed of moving objects and sense the surrounding area. A detailed circuit diagram of the system can be found in FIG. 10A and FIG. 10B.

The system was set up in the lab and a human body was used as the test object to reflect signals in this demonstration. The speed mapping and distance ranging were conducted as the volunteer first stood in front of the radar system and walked away from the radar starting at 7 s. A speed of ~0.5 m/s was detected by the radar, which is determined by the highest intensity at a given time on the velocity-time-intensity map. Starting at 15 s, the volunteer moved his hand back and forth to simulate a fast-moving object. Instantaneous speed of ~6 m/s was detected by the radar. In the measurement for short range sensing, a 2.3-2.5 GHz chirping signal was used within the antenna's bandwidth. The range with the highest signal intensity in the range-time-intensity map indicates the location of the volunteer. The volunteer walked away from the radar starting at 8 s and walked back starting at 20 s. The radar measured that the volunteer walked 8 m away with a constant speed. The RF radiation and signal transmission capability of the organic fabric antenna was clearly demonstrated in this short range Doppler radar demonstration.

In conclusion, a flexible and breathable PEDOT:PSS printed organic fabric antenna for the next generation wearable electronic system has been described. In contrast to previously reported wearable antenna, this fabric antenna can perform equally well as conventional patch antenna without using metal or metal-containing materials and can be easily integrated with other fabric-based devices on a clothing platform. The combination of the PEDOT:PSS and the fabric not only promote the conductivity of the printing by template assisted micro-phase segregation, but also helped the conducting path to form a high frequency favorable multistrand structure. Micro filler templates on the fabric fiber interact with PSS, help the formation of continuous conductive phase, also lead to well assembled highly conductive layer on the fabric fiber through a simple low-cost screen-printing method. The conducting layer showed a Litz-wire-like structure, which minimizes skin effect and increases its conductivity under high frequency. The antenna showed a center radiating frequency of 2.35 GHz, a return loss below −50 dB, and an estimated radiation efficiency of 28%. The antenna can maintain is resonant frequency under certain level of deformation. A short-range sensing Doppler radar system fabric antenna was developed and can detect the speed and distance within short range. This flexible antenna can be used in on-body/off-body wireless communication for BAN, out-patients and senior remote monitoring, and even blind assist. The screen-printing method can be applied to print other electronic devices with complex structure and can be easily scaled up for mass production. This method of fabrication of antenna is a way to integrate wireless devices into clothing without the use of metal.

Example 2. Evolution from the Copper Antenna to a Fabric Antenna

A 2.4 GHz patch antenna was made from Ultralam 2000 dielectric layer and copper sheet as the reference of the "state-of-art" patch antenna. The dimensions of the substrate and the ground plane were chosen as 80 mm×80 mm. ANSYS HFSS was used to find the feed point location and simulate the performance of the antenna. The return loss result showed that the resonant frequency of the copper antenna is at 2.35 GHz, with a 50Ω input impedance. The S11 parameter is −40 dB at the resonant frequency and almost 0 dB elsewhere, which matches well with the original design.

Next, the copper patch on the original antenna was replaced with a piece of PEDOT:PSS printed fabric. The size of the patch was recalculated based on properties of the material, and the feed point location was estimated with the help of ANSYS HFSS simulation. The results showed that the resonant frequency is still at 2.35 GHz, but certain amount of energy is not returned throughout the scan, indicating there is resistive loss in the PEDOT:PSS printed fabric.

Next, an antenna was made with copper sheet as conducting layer and PET fabric as dielectric layer to investigate the influence of the fabric as the dielectric layer. The dimension of the patch was recalculated again based on properties of the material, and the location of the feed point was estimated with the help of simulation. The S11 parameter is almost identical with the reference copper patch antenna, indicating that the PET fabric will not introduce too much loss into the device and most of the characteristic stays the same with the reference copper antenna.

With all these characterization of replacing each component, the metal-free PEDOT:PSS printed antenna was fabricated.

The antenna systems disclosed herein include(s) at least the following aspects:

Aspect 1: A flexible metal-free antenna system, comprising: a radiating element comprising a conductive polymer fabric, wherein the conductive polymer fabric comprises an electrically conductive polymer disposed on at least a portion of a fibrous substrate.

Aspect 2: The antenna system of Aspect 1, wherein the antenna system is a monopole antenna, a (Hertzian) dipole antenna, a loop antenna, a conical antenna, or a patch antenna.

Aspect 3: The antenna system of Aspect 1 or 2, wherein the antenna is (phase) arrayed for enhanced directivity, radiation efficiency, and power, and functionality.

Aspect 4: The antenna system of any one of the preceding Aspects, wherein the electrically conductive polymer is a poly(3,4-ethylenedioxythiophene), a substituted poly(3,4-ethylenedioxythiophene), poly(thiophene), a substituted poly(thiophene), poly(pyrrole), a substituted poly(pyrrole), poly(aniline), a substituted poly(aniline), poly(acetylene), poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof; or the electrically conductive polymer is in the form of a conducting polymer:template polymer comprising units of a conducting monomer wherein the conducting monomer is thiophene, substituted thiophene, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, the monomers disclosed herein as structures (I)-(XXIX), or a combination thereof, and the template polymer is a polyanion acting as a counterion for a conducting polymer.

Aspect 5: The antenna system of any one of the preceding Aspects, wherein the electrically conductive polymer is PEDOT and the conducting polymer:template polymer is PEDOT:PSS.

Aspect 6: The antenna system of any one of the preceding Aspects, wherein the fibrous substrate is a natural material, a synthetic material, or a combination thereof, and the fibrous substrate is a knit fabric, a woven fabric, a nonwoven fabric, or a combination thereof.

Aspect 7: The antenna system of any one of the preceding Aspects, wherein the fibrous substrate comprises wool, cotton, rayon, nylon 6, nylon 66, nylon 610, nylon 12, co-polymerized nylon, polyethylene terephthalate, polytrimethylene terephthalate, polybutylene terephthalate, polypropylene terephthalate, polyurethane, polypropylene, polyethylene, spandex (polyurethane-polyurea copolymer), polyester-based polyurethane, copolymers thereof, or a combination thereof; a polyester-polyurethane copolymer and optionally further comprising polyacrylic, polyamide, polycarbonate, polyether, polyester, polyethylene, polyimide, polyurethane, polyurea, polythiourea, polysiloxane, polyisoprene, polybutadiene, polyethylene oxide, polylactic acid, blends or copolymers thereof.

Aspect 8: The antenna system of any one of Aspects 1-5, wherein the conductive polymer fabric comprising an electrically conducting polymer is a fibrous substrate comprising polymeric fibers comprising nucleophile derivatized nanoparticles wherein a portion of the nucleophile derivatized nanoparticles are located at the surface of the polymeric fiber; and an electrically conductive polymer disposed on at least a portion of the polymeric fibers of the fibrous substrate and at least in partial contact with the nucleophile derivatized nanoparticles, the electrically conductive polymer may be in the form of a conducting polymer:template polymer.

Aspect 9: The antenna system of Aspect 8, wherein the nucleophile derivatized nanoparticles comprise silica, titania, alumina, calcium oxide, amine functionalized nanoparticles, or a combination thereof.

Aspect 10: The antenna system any one of the preceding Aspects, wherein the conductive polymer fabric comprising an electrically conducting polymer further comprises a secondary dopant such as DMSO.

Aspect 11: The antenna system of any one of the preceding Aspects, comprising: a ground plane layer; a fabric dielectric layer in contact with a first surface of the ground plane layer; and the radiating element in contact with a portion of a surface of the fabric dielectric layer opposite to the ground plane layer.

Aspect 12: The antenna system of Aspect 11, comprising two or more fabric dielectric layers between the ground plane layer and the radiating element; two or more radiating elements in an array on the surface of the fabric dielectric layer opposite to the ground plane layer; or a combination thereof.

Aspect 13: The antenna system of any one of Aspects 11-12, wherein the conductive polymer fabric comprising the electrically conductive polymer is a portion of the fabric dielectric layer coated with the electrically conducting polymer; or wherein the conductive polymer fabric comprising the electrically conductive polymer is a separate element from the fabric dielectric layer.

Aspect 14: The antenna system any one of Aspects 11-13, wherein: the ground plane layer comprises a PEDOT:PSS printed electrode; the fabric dielectric layer comprises polyester; and the radiating element comprises a conductive polymer fabric comprising PEDOT:PSS.

Aspect 15: The antenna system of any one of Aspects 11-14, wherein the fabric dielectric layer comprises a flexible or a flexible and stretchable fabric.

Aspect 16: The antenna system of any one of Aspects 11-15, wherein the ground plane layer comprises an electrically conducting polymer.

Aspect 17: The antenna system of any one of the preceding Aspects, wherein the system further comprises a radio frequency connector.

Aspect 18: The antenna system of any one of the preceding Aspects, incorporated in a garment, footwear, headwear, wrist band, chest strap, belt, a household textile product, or an automobile textile product.

Aspect 19: The antenna system of any one of the preceding Aspects, wherein the antenna operates as a transmitter and/or receiver at about 2.35 GHz corresponding to Wi-Fi/Bluetooth® frequency; the antenna functions as a component of a Doppler radar system; or the antenna operates as a sensor to track movement.

Aspect 20: A process of making the antenna system of any one of the preceding Aspects, comprising applying a dispersion of an electrically conductive polymer on the surface of a fibrous substrate to form the conductive polymer fabric of the radiating element.

Aspect 21: The process of Aspect 20, wherein the applying comprises a screen printing method and the dispersion is an aqueous dispersion of an electrically conductive polymer.

Aspect 22: An antenna system prepared by the process of Aspect 20 or 21.

Aspect 23: A method of transmitting or receiving radio frequency data comprising using the antenna system of any one of Aspects 1-19 and 22.

Further Aspects include: Aspect a: A flexible all organic antenna system comprised of: a ground plate layer covered with, one or more fabric layers, and a substantial portion of the fabric layer being coated with a flexible electrically conductive polymer which serves as the antenna.

Aspect b: The antenna system of Aspect a, wherein: the ground plate layer comprises a PEDOT:PSS printed electrode, the fabric layer(s) comprises polyester, and the antenna comprises flexible electrically conductive polymer and the polymer comprises PEDOT:PSS.

Aspect c: The antenna systems of Aspects a and b, wherein the formulation used for coating the fabric layer(s) further comprises DMSO as a secondary dopant.

Aspect d: The antenna systems of Aspects a to c, wherein the antenna system comprises a patch antenna.

Aspect e: The antenna systems of Aspects a to d, wherein the antenna operates as a transmitter and/or receiver at about 2.35 GHz corresponding to Wi-Fi/Bluetooth® frequency.

Aspect f: The antenna systems of Aspects a and b, wherein the fabric layer(s) is coated with a water solution of flexible electrically conductive polymer using a screen printing method.

The singular forms "a," "an," and "the" include plural referents unless the context clearly dictates otherwise. The endpoints of all ranges directed to the same component or property are inclusive of the endpoints, are independently combinable, and include all intermediate points and ranges (e.g., ranges of "up to about 25 wt. %, or, more specifically, about 5 wt. % to about 20 wt. %, yet more specifically about 7.5 wt. % to about 15 wt. %" are inclusive of the endpoints and all intermediate values of the ranges of "about 5 wt. % to about 25 wt. %," such as about 10 wt % to about 23 wt %, about 15 wt. % to about 20 wt. %, 5 wt. %, 23 wt. %, 25 wt. %, etc.).

Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

"Optional" or "optionally" means that the subsequently described event or circumstance may or may not occur, and that the description includes instances where the event occurs and instances where it does not. The modifier "about" used in connection with a quantity is inclusive of the stated value and has the meaning dictated by the context (e.g., includes the degree of error associated with measurement of the particular quantity). The terms "first," "second," and the like, "primary," "secondary," and the like, as used herein do not denote any order, quantity, or importance, but rather are used to distinguish one element from another. The terms "front", "back", "bottom", and/or "top" are used herein, unless otherwise noted, merely for convenience of description, and are not limited to any one position or spatial orientation. The term "combination" is inclusive of blends, mixtures, alloys, reaction products, and the like.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention can include only some of the described embodiments. Accordingly, the invention is not to be seen as limited by the foregoing description, but is only limited by the scope of the appended claims.

The invention claimed is:

1. A flexible metal-free antenna system, comprising:
a radiating element comprising a conductive polymer fabric, wherein the conductive polymer fabric comprises an electrically conductive polymer disposed on at least a portion of a fibrous substrate,
wherein
the electrically conductive polymer is a poly(3,4-ethylenedioxythiophene), a substituted poly(3,4-ethylenedioxythiophene), poly(thiophene), a substituted poly(thiophene), poly(pyrrole), a substituted poly(pyrrole), poly(aniline), a substituted poly(aniline), poly(acetylene), poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof, or
the electrically conductive polymer is in the form of a conducting polymer:template polymer comprising units of a conducting monomer wherein the conducting monomer is thiophene, substituted thiophene, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, the monomers disclosed herein as structures (I)-(XXIX), or a combination thereof, and
the template polymer is a polyanion acting as a counterion for a conducting polymer.

2. The antenna system of claim 1, wherein the antenna system is a monopole antenna, a dipole antenna, a loop antenna, a conical antenna, or a patch antenna.

3. The antenna system of claim 1 or 2, wherein the antenna is arrayed for enhanced directivity, radiation efficiency, power, and functionality.

4. The antenna system of claim 1, wherein
the electrically conductive polymer is PEDOT and the conducting polymer:template polymer is PEDOT:PSS.

5. The antenna system of claim 1, wherein the fibrous substrate is a natural material, a synthetic material, or a combination thereof, and
the fibrous substrate is a knit fabric, a woven fabric, a nonwoven fabric, or a combination thereof.

6. The antenna system of claim 1, wherein
the fibrous substrate comprises wool, cotton, rayon, nylon 6, nylon 66, nylon 610, nylon 12, co-polymerized nylon, polyethylene terephthalate, polytrimethylene terephthalate, polybutylene terephthalate, polypropylene terephthalate, polyurethane, polypropylene, polyethylene, spandex (polyurethane-polyurea copolymer), polyester-based polyurethane, copolymers thereof, or a combination thereof;
a polyester-polyurethane copolymer and optionally further comprising polyacrylic, polyamide, polycarbonate, polyether, polyester, polyethylene, polyimide, polyurethane, polyurea, polythiourea, polysiloxane, polyisoprene, polybutadiene, polyethylene oxide, polylactic acid, blends or copolymers thereof.

7. The antenna system of claim 1, wherein the conductive polymer fabric is
a fibrous substrate comprising polymeric fibers comprising nucleophile derivatized nanoparticles wherein a portion of the nucleophile derivatized nanoparticles are located at the surface of the polymeric fibers; and
the electrically conductive polymer disposed on at least a portion of the polymeric fibers of the fibrous substrate and at least in partial contact with the nucleophile derivatized nanoparticles, the electrically conductive polymer may be in the form of a conducting polymer:template polymer.

8. The antenna system of claim 7, wherein the nucleophile derivatized nanoparticles comprise silica, titania, alumina, calcium oxide, amine functionalized nanoparticles, or a combination thereof.

9. The antenna system of claim 1, wherein the conductive polymer fabric comprising an electrically conducting polymer further comprises a secondary dopant.

10. The antenna system of claim 1, comprising:
a ground plane layer;
a fabric dielectric layer in contact with a first surface of the ground plane layer; and
the radiating element in contact with a portion of a surface of the fabric dielectric layer opposite to the ground plane layer.

11. The antenna system of claim 10, comprising
two or more fabric dielectric layers between the ground plane layer and the radiating element;
two or more radiating elements in an array on the surface of the fabric dielectric layer opposite to the ground plane layer; or
a combination thereof.

12. The antenna system of claim 10,
wherein the conductive polymer fabric comprising the electrically conductive polymer is a portion of the fabric dielectric layer coated with the electrically conducting polymer; or
wherein the conductive polymer fabric comprising the electrically conductive polymer is a separate element from the fabric dielectric layer.

13. The antenna system of claim 10, wherein:
the ground plane layer comprises a PEDOT:PSS printed electrode;
the fabric dielectric layer comprises polyester; and
the radiating element comprises a conductive polymer fabric comprising PEDOT:PSS.

14. The antenna system of claim 10, wherein the fabric dielectric layer comprises a flexible or a flexible and stretchable fabric.

15. The antenna system of claim 10, wherein the ground plane layer comprises an electrically conducting polymer.

16. The antenna system of claim 1, wherein the system further comprises a radio frequency connector.

17. The antenna system of claim 1, incorporated in a garment, footwear, headwear, wrist band, chest strap, belt, a household textile product, or an automobile textile product.

18. The antenna system of claim 1, wherein
the antenna operates as a transmitter and/or receiver at about 2.35 GHz corresponding to Wi-Fi/Bluetooth® frequency;
the antenna functions as a component of a Doppler radar system; or
the antenna operates as a sensor to track movement.

19. A process of making an antenna system, comprising:
applying a dispersion of an electrically conductive polymer on a surface of a fibrous substrate to form a conductive polymer fabric;
preparing a radiating element from the conductive polymer fabric; and
preparing a flexible metal-free antenna system comprising the radiating element,
wherein
the electrically conductive polymer is a poly(3,4-ethylenedioxythiophene), a substituted poly(3,4-ethylenedioxythiophene), poly(thiophene), a substituted poly(thiophene), poly(pyrrole), a substituted poly(pyrrole), poly(aniline), a substituted poly(aniline), poly(acetylene), poly(p-phenylenevinylene) (PPV), a poly(indole), a substituted poly(indole), a poly(carbazole), a substituted poly(carbazole), a poly(azepine), a (poly)thieno[3,4-b]thiophene, a substituted poly(thieno[3,4-b]thiophene), a poly(dithieno[3,4-b:3',4'-d]thiophene), a poly(thieno[3,4-b]furan), a substituted poly(thieno[3,4-b]furan), a derivative thereof; or
the electrically conductive polymer is in the form of a conducting polymer:template polymer comprising units of a conducting monomer wherein the conducting monomer is thiophene, substituted thiophene, 3,4-ethylenedioxythiophene, thieno[3,4-b]thiophene, substituted thieno[3,4-b]thiophene, dithieno[3,4-b:3',4'-d]thiophene, thieno[3,4-b]furan, substituted thieno[3,4-b]furan, bithiophene, substituted bithiophene, pyrrole, substituted pyrrole, phenylene, substituted phenylene, naphthalene, substituted naphthalene, biphenyl and terphenyl and their substituted versions, phenylene vinylene, substituted phenylene vinylene, aniline, substituted aniline, the monomers disclosed herein as structures (I)-(XXIX), or a combination thereof, and
the template polymer is a polyanion acting as a counterion for a conducting polymer.

20. The process of claim 19, wherein the applying comprises a screen printing method and the dispersion is an aqueous dispersion of an electrically conductive polymer.

* * * * *